US009246655B2

(12) United States Patent
Olsson et al.

(10) Patent No.: US 9,246,655 B2
(45) Date of Patent: Jan. 26, 2016

(54) MAINTAINING PACKET SWITCHED SESSION IN LTE WHEN ESTABLISHING GSM CIRCUIT SWITCHED CALL

(75) Inventors: Magnus Olsson, Stockholm (SE); Göran Rune, Linköping (SE); Per Synnergren, Luleå (SE); Erik Westerberg, Enskede (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 396 days.

(21) Appl. No.: 12/943,685

(22) Filed: Nov. 10, 2010

(65) Prior Publication Data
US 2011/0149853 A1 Jun. 23, 2011

Related U.S. Application Data

(60) Provisional application No. 61/287,575, filed on Dec. 17, 2009, provisional application No. 61/287,623, filed on Dec. 17, 2009, provisional application No. 61/287,438, filed on Dec. 17, 2009, provisional application No. 61/287,627, filed on Dec. 17, 2009, provisional application No. 61/287,630, filed on Dec. 17, 2009, provisional application No. 61/287,954, filed on Dec. 17, 2009.

(51) Int. Cl.
*H04L 5/00* (2006.01)
*H04W 36/00* (2009.01)
*H04W 60/00* (2009.01)
*H04W 72/12* (2009.01)
*H04W 72/02* (2009.01)
(Continued)

(52) U.S. Cl.
CPC ......... *H04L 5/0055* (2013.01); *H04W 36/0022* (2013.01); *H04W 60/005* (2013.01); *H04W 72/02* (2013.01); *H04W 72/0446* (2013.01); *H04W 72/1215* (2013.01); *H04W 76/045* (2013.01); *H04W 88/02* (2013.01); *H04W 88/06* (2013.01); *H04W 88/08* (2013.01)

(58) Field of Classification Search
None
See application file for complete search history.

(56) References Cited

U.S. PATENT DOCUMENTS 6,122,270 A 9/2000 Whinnett et al.
6,463,054 B1 10/2002 Mazur et al.
(Continued)

FOREIGN PATENT DOCUMENTS

EP 1740007 A1 1/2007
EP 2197236 A1 6/2010
(Continued)

OTHER PUBLICATIONS

3GPP TS 24.008, V10.1.0; 3rd Generation Partnership Project; Technical Specification Group Core Network and Terminals; Mobile Radio Interface Layer 3 Specification; Core Network Protocols; Stage 3 (Release 10); Dec. 2010.
(Continued)

*Primary Examiner* — Ian N Moore
*Assistant Examiner* — Latresa McCallum
(74) *Attorney, Agent, or Firm* — Withrow & Terranova, PLLC

(57) ABSTRACT

A wireless terminal (30) communicates across a wireless interface with a Long Term Evolution (LTE) radio access technology network (22-1) and a circuit switched network (22-2). The wireless terminal (30) establishes a circuit switched call with the circuit switched network (22-2); maintains a packet switched session with the Long Term Evolution (LTE) radio access technology network (22-1) during establishment of the circuit switched call; and, multiplexes transmissions of the packet switched session with transmissions of the circuit switched call.

6 Claims, 15 Drawing Sheets

(51) Int. Cl.
*H04W 72/04* (2009.01)
*H04W 76/04* (2009.01)
*H04W 88/06* (2009.01)
*H04W 88/02* (2009.01)
*H04W 88/08* (2009.01)

(56) References Cited

U.S. PATENT DOCUMENTS

| | | | |
|---|---|---|---|
| 6,560,457 | B1 | 5/2003 | Silver et al. |
| 6,608,832 | B2 * | 8/2003 | Forslow ............... 370/353 |
| 6,751,472 | B1 | 6/2004 | Muhonen |
| 6,904,058 | B2 * | 6/2005 | He et al. ............... 370/477 |
| 7,171,216 | B1 | 1/2007 | Choksi |
| 7,463,901 | B2 * | 12/2008 | Svedberg et al. ............. 455/518 |
| 8,045,985 | B2 | 10/2011 | Ahn |
| 8,107,433 | B2 | 1/2012 | Jokinen |
| 8,107,954 | B2 | 1/2012 | Islam et al. |
| 8,125,960 | B2 | 2/2012 | Iwamura et al. |
| 8,144,696 | B2 | 3/2012 | Kallio et al. |
| 8,219,085 | B2 | 7/2012 | Mittal et al. |
| 8,320,291 | B2 | 11/2012 | Rune et al. |
| 8,358,629 | B2 | 1/2013 | Grilli et al. |
| 8,537,748 | B2 * | 9/2013 | Witzel et al. ............... 370/328 |
| 8,594,074 | B2 | 11/2013 | Olsson et al. |
| 8,976,757 | B2 * | 3/2015 | Bennett et al. ............... 370/331 |
| 2002/0016859 | A1 | 2/2002 | Jaenecke et al. |
| 2003/0109256 | A1 | 6/2003 | Holcman |
| 2004/0043793 | A1 | 3/2004 | Sakata |
| 2004/0184439 | A1 | 9/2004 | Blanc et al. |
| 2005/0043046 | A1 | 2/2005 | Lee |
| 2005/0220079 | A1 | 10/2005 | Asokan |
| 2006/0073831 | A1 | 4/2006 | Guyot et al. |
| 2006/0073841 | A1 | 4/2006 | Narasimha et al. |
| 2007/0207824 | A1 | 9/2007 | Bhattacharjee et al. |
| 2008/0037515 | A1 * | 2/2008 | Sander ............... 370/352 |
| 2008/0194264 | A1 | 8/2008 | Eckert et al. |
| 2008/0214190 | A1 | 9/2008 | Aalto |
| 2008/0298353 | A1 | 12/2008 | Zhu et al. |
| 2009/0010247 | A1 | 1/2009 | Stille |
| 2009/0036131 | A1 | 2/2009 | Diachina et al. |
| 2009/0086674 | A1 | 4/2009 | Ejzak |
| 2009/0201835 | A1 * | 8/2009 | Balakrishnan et al. ........ 370/261 |
| 2009/0238143 | A1 | 9/2009 | Mukherjee et al. |
| 2009/0276532 | A1 | 11/2009 | Bishop |
| 2009/0285157 | A1 | 11/2009 | Yeoum et al. |
| 2010/0085962 | A1 | 4/2010 | Issaeva et al. |
| 2010/0098023 | A1 * | 4/2010 | Aghili et al. ............... 370/331 |
| 2010/0113010 | A1 | 5/2010 | Tenny et al. |
| 2010/0135200 | A1 | 6/2010 | Karaoguz et al. |
| 2010/0172329 | A1 | 7/2010 | Yokoyama et al. |
| 2010/0173667 | A1 | 7/2010 | Hui et al. |
| 2010/0177669 | A1 | 7/2010 | Suo et al. |
| 2010/0202413 | A1 * | 8/2010 | Vikberg et al. ............... 370/332 |
| 2010/0234026 | A1 | 9/2010 | Tenny et al. |
| 2011/0110326 | A1 | 5/2011 | Rexhepi et al. |
| 2011/0122864 | A1 * | 5/2011 | Cherifi et al. ............... 370/352 |
| 2011/0134882 | A1 | 6/2011 | Aoyama et al. |
| 2011/0149852 | A1 | 6/2011 | Olsson et al. |
| 2011/0149853 | A1 | 6/2011 | Olsson et al. |
| 2011/0149907 | A1 | 6/2011 | Olsson et al. |
| 2011/0149908 | A1 | 6/2011 | Olsson et al. |
| 2011/0149925 | A1 | 6/2011 | Olsson et al. |
| 2011/0151874 | A1 | 6/2011 | Olsson et al. |
| 2012/0113900 | A1 | 5/2012 | Shaheen |
| 2013/0017805 | A1 | 1/2013 | Andre Jonsson et al. |

FOREIGN PATENT DOCUMENTS

| | | | |
|---|---|---|---|
| WO | 0101720 | A1 | 1/2001 |
| WO | 0182637 | A1 | 11/2001 |
| WO | 2004057894 | A1 | 7/2004 |
| WO | 2008/088245 | A1 | 7/2008 |
| WO | 2008087518 | A2 | 7/2008 |
| WO | 2008088243 | | 7/2008 |
| WO | 2008088245 | A1 | 7/2008 |
| WO | 2008088258 | A1 | 7/2008 |
| WO | 2008/148432 | A1 | 12/2008 |
| WO | 2009000696 | A1 | 12/2008 |
| WO | 2009044458 | A1 | 4/2009 |
| WO | 2009/087099 | A1 | 7/2009 |
| WO | 2009/084146 | A1 | 9/2009 |
| WO | 2010146468 | A2 | 12/2010 |
| WO | 2011073847 | A2 | 6/2011 |
| WO | 2011073847 | A3 | 6/2011 |
| WO | 2011073849 | A1 | 6/2011 |
| WO | 2011073884 | A1 | 6/2011 |
| WO | 2011073910 | A1 | 6/2011 |
| WO | 2011073913 | A1 | 6/2011 |
| WO | 2011073946 | A1 | 6/2011 |

OTHER PUBLICATIONS

International Search Report and Written Opinion mailed Apr. 26, 2011 in PCT application PCT/IB2010/055609.
3GPP TS 36.331 V8.9.0; Technical Specification Group Radio Access Network; Evolved Universal Terrestrial Radio Access (E-UTRA); Radio Resource Control (RRC); Protocol Specification (Release 8) (Mar. 2010).
International Search Report and Written Opinion mailed May 18, 2011 in PCT application PCT/IB2010/055816.
International Search Report and Written Opinion mailed May 17, 2011 in PCT application PCT/IB2010/055820.
International Search Report and Written Opinion mailed May 18, 2011 in PCT application PCT/IB2010/055888.
International Search Report and Written Opinion mailed Jun. 15, 2011 in PCT application PCT/IB2010/055601.
International Search Report and Written Opinion mailed May 13, 2011 in PCT application PCT/IB2010/055778.
3GPP TS 36.331 V10.1.0 3rd Generation Partnership Project; Evolved Universal Terrestrial Radio Access (E-UTRA); Radio Resource Control (RRC); Protocol Specification (Release 10) (Mar. 2011).
3GPP TS 23.272 V10.3.1, 3rd Generation Partnership Project; Technical Specification Group Services and System Aspects; Circuit Switched (CS) fallback in Evolved Packet System (EPS); Stage 2 (Release 10) (Apr. 2011).
General Packet Radio Service (GPRS) enhancements for Evolved Universal Terrestrial Radio Access Network (E-UTRAN) access, 3GPP Technical Specification, Mar. 2011, V10.3.0.
3GPP TS 25.331 V10.3.1, 3rd Generation Partnership Project; Technical Specification Group Radio Access Network; Radio Resource Control (RRC); Protocol Specification (Release 10) (Apr. 2011).
3GPP TS 23.272 V8.4.0, Digital Cellular Telecommunications System (Phase 2+); Universal Mobile Telecommunications System (UMTS); LTE; Circuit Switched (CS) Fallback in Evolved Packet System (EPS); Stage 2 (Release 8) Jun. 1, 2009.
U.S. Appl. No. 13/180,195, filed Jul. 11, 2011, entitled "Method and Apparatus for Transferring Telecommunications Connections".
Office Action mailed Dec. 11, 2012 in U.S. Appl. No. 12/943,770.
Office Action mailed Dec. 20, 2012 in U.S. Appl. No. 12/943,504.
Office Action mailed Nov. 19, 2012 in U.S. Appl. No. 12/943,612.
Office Action mailed Oct. 1, 2012 in U.S. Appl. No. 12/943,801.
Office Action mailed Oct. 5, 2012 in U.S. Appl. No. 12/943,736.
Office Action mailed Jul. 12, 2013 in U.S. Appl. No. 12/943,801.
Office Action mailed May 31, 2013 in U.S. Appl. No. 12/943,612.
Notice of Allowance mailed May 15, 2013 in U.S. Appl. No. 12/943,736.
Non-final Office Action for U.S. Appl. No. 12/943,612 mailed Apr. 10, 2014, 13 pages.
3GPP TS 23.272, "3rd Generation Partnership Project; Technical Specification Group Services and System Aspects; Circuit Switched (CS) fallback in Evolved Packet System (EPS); Stage 2 (Release 10)," V10.4.0, 3GPP Organizational Partners, Jun. 2011, 78 pages.
3GPP TS 23.401, "3rd Generation Partnership Project; Technical Specification Group Services and System Aspects; General Packet Radio Service (GPRS) enhancements for Evolved Universal Terrestrial Radio Access Network (E-UTRAN) access (Release 10)," V10.4.0, 3GPP Organizational Partners, Jun. 2011, 281 pages.

(56) References Cited

OTHER PUBLICATIONS

3GPP TS 23.401, "3rd Generation Partnership Project; Technical Specification Group Services and System Aspects; General Packet Radio Service (GPRS) enhancements for Evolved Universal Terrestrial Radio Access Network (E-UTRAN) access (Release 10)," V10.3.0, 3GPP Organizational Partners, Mar. 2011, 278 pages.

3GPP TS 25.331, "3rd Generation Partnership Project; Technical Specification Group Radio Access Network; Radio Resource Control (RRC); Protocol specification (Release 10)," V10.4.0, 3GPP Organizational Partners, Jun. 2011, 1879 pages.

3GPP TS 25.331, "3rd Generation Partnership Project; Technical Specification Group Radio Access Network; Radio Resource Control (RRC); Protocol specification (Release 10)," V10.1.0, 3GPP Organizational Partners, Sep. 2010, 1806 pages.

3GPP TS 25.413, "3rd Generation Partnership Project; Technical Specification Group Radio Access Network; UTRAN Iu interface Radio Access Network Application Part (RANAP) signalling (Release 10)," V10.0.0, 3GPP Organizational Partners, Dec. 2010, 409 pages.

3GPP TS 25.413, "3rd Generation Partnership Project; Technical Specification Group Radio Access Network; UTRAN Iu interface Radio Access Network Application Part (RANAP) signalling (Release 10)," V10.2.0, 3GPP Organizational Partners, Jun. 2011, 425 pages.

Author Unknown, "Utra Cell_DCH mobility to UTRA and EUTRA CSG cells," 3GPP TSG-RAN WG2 Meeting #66bis, R2-093836, Nokia Siemens Networks, Nokia Corporation, Los Angeles, USA, Jun. 4-Jul. 3, 2009, 7 pages.

Author Unknown, "Correction of CSFB," 3GPP TSG-RAN WG3 #67, R3-101145, Alcatel-Lucent, NTT Docomo, San Francisco, USA, Feb. 22-26, 2010, 3 pages.

Author Unknown, "On the alternative selection for Single Radio VCC from LTE," 3GPP TSG SA WG2.Architecture—S2#57, S2-071929, Nokia Siemens Networks, Nokia, Beijing, China, Apr. 23-27, 2007, 5 pages.

Author Unknown, "Details on the RRC Connection Release procedure," 3GPP TSG-RAN WG2 #61, Tdoc R2-080930, Ericsson, Sorrento, Italy, Feb. 11-15, 2008, 9 pages.

Written Opinion for International Patent Application PCT/SE2011/051076 mailed Aug. 16, 2013, 12 pages.

Notice of Allowance for U.S. Appl. No. 12/943,736 mailed Aug. 22, 2013, 18 pages.

Final Office Action for U.S. Appl. No. 13/180,195 mailed Mar. 6, 2014, 17 pages.

Non-final Office Action for U.S. Appl. No. 12/943,801 mailed Feb. 7, 2014, 15 pages.

Notice of Allowance mailed Jan. 9, 2014 in U.S. Appl. No. 12/943,504.

Office Action mailed Nov. 12, 2013 in U.S. Appl. No. 13/180,195.

Notice of Allowance for U.S. Appl. No. 12/943,504 mailed Jul. 15, 2014, 5 pages.

Non-final Office Action for U.S. Appl. No. 12/943,801 mailed Aug. 1, 2014, 14 pages.

Final Office Action for U.S. Appl. No. 12/943,612 mailed Nov. 5, 2014, 15 pages.

Final Office Action for U.S. Appl. No. 12/943,801 mailed Feb. 3, 2015, 15 pages.

Advisory Action for U.S. Appl. No. 12/943,612, mailed Mar. 20, 2015, 3 pages.

Non-Final Office Action for U.S. Appl. No. 13/180,195, mailed Jan. 16, 2015, 19 pages.

Non-Final Office Action for U.S. Appl. No. 12/943,612, mailed Jun. 30, 2015, 11 pages.

Notice of Allowance for U.S. Appl. No. 12/943,801, mailed Oct. 5, 2015, 8 pages.

\* cited by examiner

Fully UE centric solution

Network assisted solution

US 9,246,655 B2

MAINTAINING PACKET SWITCHED SESSION IN LTE WHEN ESTABLISHING GSM CIRCUIT SWITCHED CALL

RELATED APPLICATIONS

This application is related to the following U.S. Provisional Patent Applications, all of which are incorporated herein by reference in their entireties:
U.S. Provisional Patent Application 61/287,575 (attorney docket: 2380-1425) to Magnus Olsson et al., entitled "GSM and LTE Multiplexing Systems", filed on Dec. 17, 2009.
U.S. Provisional Patent Application 61/287,623 (attorney docket: 2380-1426) to Magnus Olsson et al., entitled "Measurement Report Relay in Access Division Multiplexing Systems", filed on Dec. 17, 2009.
U.S. Provisional Patent Application 61/287,438 (attorney docket: 2380-1427) to Magnus Olsson et al., entitled "WCDMA and LTE Multiplexing", filed on Dec. 17, 2009.
U.S. Provisional Patent Application 61/287,627 (attorney docket: 2380-1428) to Magnus Olsson et al., entitled "Telecommunications Multiplexing", filed on Dec. 17, 2009.
U.S. Provisional Patent Application 61/287,630 (attorney docket: 2380-1429) to Magnus Olsson et al., entitled "Access Division Multiplexing—Call Setup Performance Improvement", filed on Dec. 17, 2009.
U.S. Provisional Patent Application 61/287,954 (attorney docket: 2380-1433) to Magnus Olsson et al., entitled "Scheduled Optimized for GSM and LTD Multiplexing", filed on Dec. 17, 2009.
This application is related to the following U.S. patent applications, all of which are filed on same date herewith and incorporated herein by reference in their entireties:
U.S. patent application Ser. No. 12/943,801 to Magnus Olsson et al., entitled "GSM and LTE Multiplexing".
U.S. patent application Ser. No. 12/943,770 to Magnus Olsson et al., entitled "Link Report Relay in Access Division Multiplexing Systems".
U.S. patent application Ser. No. 12/943,612 to Magnus Olsson et al., entitled "Keeping Packet Switched Session in LTE While Circuit Switched Registered in WCDMA".
U.S. patent application Ser. No. 12/943,736 to Magnus Olsson et al., entitled "Call Setup For Access Division Multiplexing".
U.S. patent application Ser. No. 12/943,504 to Magnus Olsson et al., entitled "Scheduling For Access Division Multiplexing".

TECHNICAL FIELD

This technology pertains to wireless communications networks, and particularly to access division multiplexing (ADM).

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Serving Gateways, or SGWs) rather than to radio network controller (RNC) nodes. In general, in LTE the functions of a radio network controller (RNC) node are distributed between the radio base stations nodes (eNodeB's in LTE) and SGWs. As such, the radio access network (RAN) of an LTE system has an essentially "flat" architecture comprising radio base station nodes without reporting to radio network controller (RNC) nodes.

Cellular Circuit-Switched (CS) telephony was introduced in the first generation of mobile networks. Since then CS telephony has become the largest service in the world with approximately 4 billion subscriptions sold. Even today, the main part of the mobile operator's revenue comes from the CS telephony service (including Short Message Services (SMS)), and the 2G GSM networks still dominate the world in terms of subscriptions. 3G subscriptions are increasing in volume, but that increase is less in part because of users with handheld mobile terminals migrating from 2G to 3G and more as a result of mobile broadband implemented via dongles or embedded chipsets in laptops.

The long-term evolution (LTE) project within 3GPP aims to further improve the 3G standard to, among other things, provide even better mobile broadband to the end-users (higher throughput, lower round-trip-times, etc.).

A common view in the telecommunication industry is that the future networks will be all-IP networks. Based on this assumption, the CS domain was removed in the LTE work. As a result, the telephony service cannot be used by a 3GPP Release 8 compliant LTE terminal, unless one of the following four things is done:
(1) Implement circuit switched (CS) fallback (CSFB), so that an LTE terminal falls back to 2G GSM when telephony service is used.
(2) Implement 3GPP IP Multimedia Subsystem (IMS)/Multimedia Telephony (MMTel), which is a simulated CS telephony service provided over IP and IMS that inter-works with the Public Switched Telephone Network (PSTN)/Public Land Mobile Network (PLMN).

(3) Implement a tunneling solution with Unlicensed Mobile Access (UMA)/Generic Access Network (GAN) over LTE where the CS service is encapsulated into an IP tunnel.

(4) Implement a proprietary Voice over IP (VoIP) solution with PSTN/PLMN interworking.

All of these four possibilities have drawbacks. In deployed GSM networks that do not have Dual Transfer Mode (DTM) capabilities; CS and Packet Switched (PS) services cannot be used in parallel. Hence, all PS services running prior to a call to or from a terminal using Circuit Switched Fallback (CSFB) are put on hold or are terminated. If the GSM network has DTM, the PS performance will be greatly reduced (from 10's of Mbps to 10's to 100's of kbps). One drawback with the CS fallback approach is that when calling or being called and the terminal is falling back to GSM and the CS service from LTE. Circuit Switched Fallback (CSFB) also prolongs call set-up time.

The IMS/MMTel approach uses a completely new core/service layer that is IMS based. This provides new possibilities to enhance the service but also comes with the drawback of a financial hurdle for the operator to overcome. A new core network drives capital expenditures (CAPEX), and integration of that core network drives an initial operating expenditures (OPEX) increase. Further, the IMS/MMTel approach needs features implemented in the terminals and the legacy CS network in order to handle voice handover to/from the 2G/3G CS telephony service.

Using UMA/GAN over LTE is not a standardized solution so a drawback is that it is a proprietary solution which may make terminal availability a problem. It also adds additional functions to the core/service layer in both the network and terminal, e.g., a GAN controller in the network and GAN protocols in the UE terminal.

The proprietary VoIP approach, if operator controlled, comes with the same drawbacks as for the IMS/MMTel (new core/service layer) approach along with the difficulties associated with it being proprietary and handover to 2G/3G CS may not be supported.

There is yet a further solution for using a legacy CS telephony service with a wireless terminal such as a 3GPP release 8-compliant LTE terminal. In that further solution, also known as a type of Access Division Multiplexing (ADM), transmissions of GSM CS voice are interleaved in between LTE transmissions. See, e.g., PCT/SE2007/000358, which is incorporated herein by reference. In one example implementation of such an ADM solution a wireless terminal simultaneously communicates with two TDMA-based radio systems, e.g., the wireless terminal can maintain communications paths to both systems by means of alternating in time its communication between the two systems. The toggling between the two systems is on a time scale small enough to effectively yield a simultaneous communication between the two systems.

The ADM solution attempts to achieve a good PS connection in parallel with the telephony service when in LTE coverage but still reusing the legacy CS core and deployed GSM network for the telephony service to reduce costs but still maintain good coverage for the telephony service.

The ADM solution may be implemented in several ways. A first example implementation, illustrated in FIG. 1A, is a fully UE-centric solution where no coordination is needed between the GSM CS core and a LTE PS core. A second example implementation, illustrated by FIG. 1B, is a network assisted solution which can either be based on circuit switched fallback (CSFB), or a solution that only reuses paging over LTE.

From a radio perspective, the ADM solution can be realized in any of three different ways: As a first example radio realized embodiment illustrated in FIG. 2A, the LTE transmissions could be multiplexed with the GSM transmissions on a GSM TDMA frame level. In FIG. 2A, frames for GSM transmissions and frames of LTE transmissions have different darkness shading. This first example solution requires that the GSM circuit switched (CS) telephony service only use the half rate codec. When GSM is running at half rate, then every second GSM TDMA frame is not used by the user.

As a second example radio-realized embodiment illustrated in FIG. 2B, the LTE transmissions could be multiplexed with the GSM transmissions on GSM burst level. GSM transmits speech using bursts, each with a duration of 0.577 ms. In speech operation, after having sent one burst, the Rx/Tx part sleeps for 7*0.577 ms until it wakes up again and do a new Rx/Tx process. In this second example this time gap could be used for LTE transmissions.

As a third example radio-realized embodiment illustrated in FIG. 2C, any of above can be used for transmission but by using dual receiver for simultaneous reception of GSM and LTE in the downlink for simplified operation.

The architecture and principles of the circuit switched fallback (CSFB) are defined in, e.g., 3GPP TS 23.272, Circuit Switched Fallback in Evolved Packet System, Stage 2 (Release 8), which is abbreviated herein as "23.272" and which is incorporated herein by reference in its entirety.

The current circuit switched fallback (CSFB) solution does not allow the wireless terminal (e.g., user equipment unit (UE)) to multiplex transmissions of a circuit switched (CS) voice in Global System for Mobile communication (GSM) with transmissions of a packet switched (PS) session in Long Term Evolution (LTE). For example, the packet switched (PS) session may be moved to GSM as soon as a CS voice call is originated or terminated, as shown in FIG. 3. However, if multiplexing of a circuit switched (CS) call and a packet switched (PS) session is not supported in GSM, e.g. if a Dual Transfer Mode (DTM) is not supported in GSM, the packet switched (PS) session is suspended, as shown in FIG. 4. Recent developments in 3GPP have changed the way that the suspension is executed, but the result is still the same, i.e., no PS connection is possible while the CS call is active (and DTM not supported).

The signalling sequence for the existing circuit switched fallback (CSFB) solution (not using the packet switched (PS) handover alternative) as defined by 3GPP is shown in FIG. 5. FIG. 5 shows, e.g., the originating circuit switched (CS) Call Request in E-UTRAN, Call in GSM Edge Radio Access Network (GERAN)/UTRAN without packet switched (PS) handover (HO) (see, e.g., FIG. 6.3-1 of 3GPP TS 23.272, Circuit Switched Fallback in Evolved Packet System, Stage 2 (Release 8), which is incorporated by reference herein in its entirety). The sequence in FIG. 5 results in packet switched bearers being moved to GSM (e.g., via a routing area (RA) Update procedure or Combined RA/LA Update procedure in step 6). If CS+PS multiplexing is not supported, e.g., by not supporting DTM in GSM, the PS bearers are also suspended for the duration of the CS call.

Concerning various details of FIG. 5, step 3 generically depicts activities involved with release of the UE (with or without system information). Release of the UE, and hence release of the packet switched (PS) bearers for LTE, occurs either through a Network Assisted Cell Change (e.g., NACC) as depicted by step 3a or through a RRC Connection Release for the target access. Traditionally the Network Assisted Cell Change (e.g., NACC) is an inter-radio access technology (e.g., inter-rat) cell change order message that provides information including system information to the terminal regarding which access and which cell to go to, whereas the RRC Connection Release includes only general re-direct information such as access and frequency. Step 4 of FIG. 5 depicts the eNodeB sending a S1-AP context release request message to the mobility management entity (MME), which results in release of the S1 connection (e.g., a S1 UE context release) as depicted by step 5 of FIG. 5. Step 6 of FIG. 5 depicts performance of the routing area (RA) Update procedure towards the GSM Edge Radio Access Network (GERAN)/UTRANPS Domain. In context of the technology disclosed herein step 6 of FIG. 5 also depicts/applies to a routing area update procedure towards the GSM Edge Radio Access Network (GERAN). Step 7a, 7b, and 8 of FIG. 5 relate to suspension of the GSM packet switched (PS) bearers (if Dual Transfer Mode (DTM) is not supported in GSM). Step 11 of FIG. 5 depicts performance of the routing area (RA) Update (or combined RA/LA Update) to resume the LTE packet switched (PS) bearers after the circuit switched (CS) call is finished if the GSM PS bearers were suspended by step 7a, 7b, and 8. For yet other details concerning FIG. 5, see, e.g., 3GPP TS 23.272, Circuit Switched Fallback in Evolved Packet System, Stage 2 (Release 8), Chapter 6.5, which is incorporated herein by reference.

FIG. 6 illustrates terminating a CS Call Request in E-UTRAN, Call in GERAN/UTRAN without packet switched (PS) handover (HO) (see, e.g., FIG. 7.4-1 of 3GPP TS 23.272, Circuit Switched Fallback in Evolved Packet System, Stage 2 (Release 8)). Concerning various details of FIG. 6, step 3 generically depicts activities involved with release of the UE (with or without system information). Release of the UE, and hence release of the packet switched (PS) bearers for LTE, occurs either through a Network Assisted Cell Change (e.g., NACC) as depicted by step 3a or through a RRC Connection Release for the target access. Step 4 of FIG. 6 depicts the eNodeB sending a S1-AP context release request message to the mobility management entity (MME), which results in release of the S1 connection (e.g., a S1 UE context release) as depicted by step 5 of FIG. 6. Step 6 of FIG. 6 depicts performance of the routing area (RA) Update towards the GERAN/UTRAN PS Domain. In context of the technology disclosed herein step 6 of FIG. 5 also depicts/applies to a routing area update towards the GERAN for the Global System for Mobile communication (GSM) (e.g., GERAN (GSM)]. Step 7a, 7b, and 8 of FIG. 6 relate to suspension of the GSM packet switched (PS) bearers (if Dual Transfer Mode (DTM) is not supported in GSM). For more details concerning FIG. 6, see 3GPP TS 23.272, Circuit Switched Fallback in Evolved Packet System, Stage 2 (Release 8), chapter 7.4, which is incorporated herein by reference. Not shown in FIG. 6, but mentioned in chapter 7.4 of 3GPP TS 23.272, Circuit Switched Fallback in Evolved Packet System, Stage 2 (Release 8), the wireless terminal performs routing area (RA) Update (or combined RA/LA Update) to resume the LTE PS bearers after the CS call is finished if the PS bearers were suspended by step 7a, 7b, and 8.

SUMMARY

The technology disclosed herein provides embodiments and modes wherein the circuit switched fallback (CSFB) solution is improved to enable multiplexing of circuit switched (CS) voice in Global System for Mobile communication (GSM) with a packet switched (PS) session in Long Term Evolution (LTE).

In one of its aspects the technology disclosed herein concerns a method of operating a wireless terminal configured to communicate across a wireless interface with a Long Term Evolution (LTE) radio access technology network and a circuit switched network. The method comprises establishing a circuit switched call with the circuit switched network; maintaining a packet switched session with the Long Term Evolution (LTE) radio access technology network upon establishment of the circuit switched call; and thereafter multiplexing transmissions of the packet switched session with transmissions of the circuit switched call. In an example implementation the method further comprises maintaining the packet switched session during at least a portion of the circuit switched call.

The technology disclosed herein can be operated either in a terminal-centric mode or a network-centric mode. In an example mode and embodiment of the terminal-centric mode, the method further comprises, upon the establishment of the circuit switched call, receiving an order from a node of the LTE network to move to a circuit switched network for accommodating the circuit switched call; the wireless terminal: refraining from performing a routing area update and a combined routing area/location area update; and re-establishing a packet switched bearer in the LTE network.

In the network-centric mode the wireless terminal method further comprising the wireless terminal, upon the establishment of the circuit switched call, receiving an order from a node of the LTE network to move to a circuit switched network for accommodating the circuit switched call; and performing a Location Area (LA) update (if needed) but not performing a routing area update or a combined routing area/location area update. In the network-centric mode performance of the Location Area (LA) update is optional, i.e., is only performed in some cases (e.g., if the LA stored in the terminal from, e.g., a previous registration, in accordance with the CSFB solution).

In the terminal-centric mode of operation the terminal decides independently that it shall not perform the Routing Area Update (RAU) while in the network-centric mode of operation. This is part of the order that includes keeping the packet switched session.

In another of its aspects the technology disclosed herein concerns a wireless terminal configured to maintain a packet switched session with a Long Term Evolution (LTE) radio access technology network upon establishment of a circuit switched call and to multiplex transmissions of the packet switched session with transmissions of the circuit switched call. In an example embodiment the wireless terminal is configured to maintain the packet switched session during at least a portion of the circuit switched call.

In an example embodiment the wireless terminal comprises a circuit switched call controller; a packet switched session controller; and a communications interface. The circuit switched call controller is configured to establish the circuit switched call and to govern the transmissions of the circuit switched call. The packet switched session controller is configured to establish and then maintain the packet switched session including the transmissions of the packet switched session upon establishment of the circuit switched call. The communications interface is configured to perform transmissions over a radio interface including the transmissions of the circuit switched call and the transmissions of the packet switched session.

In an example terminal-centric embodiment of the wireless terminal the packet switched call controller is configured during the establishment of the circuit switched call to: refrain from performing a routing area update and a combined routing area/location area update; and to re-establish a packet switched bearer in the LTE network.

In an example network-centric embodiment of the wireless terminal the packet switched call controller is configured during the establishment of the circuit switched call to receive an order from a node of the LTE network to move to a circuit switched network for accommodating the circuit switched call and to optionally perform a Location Area (LA) update but not perform a routing area update or a combined routing area/location area update.

In another of its aspects the technology disclosed herein concerns a base station node of a Long Term Evolution (LTE) network. The base station node is configured to maintain a packet switched session with a wireless terminal upon establishment of a circuit switched call involving the wireless terminal. In an example implementation, the base station node comprises a controller configured to order the wireless terminal to move to a circuit switched network for accommodating the circuit switched call without releasing a packet switched bearer of the packet switched session.

In another of its aspects the technology disclosed herein concerns a method of operating a base station node of a Long Term Evolution (LTE) network. The method comprises participating in a packet switched session with a wireless terminal; and then maintaining a packet switched session with a wireless terminal upon establishment of a circuit switched call involving the wireless terminal. The act of maintaining the packet switched session comprises ordering the wireless terminal to move to a circuit switched network without releasing packet switched bearers of the packet switched session and not requesting release of the packet switched session.

In another of its aspects the technology disclosed herein concerns a method of operating a communications system. The communication system comprises a circuit switched network and a Long Term Evolution (LTE) radio access technology network. The system operation method comprises establishing a packet switched session between a wireless terminal and the Long Term Evolution (LTE) network; during the packet switched session establishing a circuit switched call between the wireless terminal and the circuit switched network; upon establishing the circuit switched call maintaining the packet switched session with the Long Term Evolution (LTE) radio access technology network; and, multiplexing transmissions of the packet switched session with transmissions of the circuit switched call.

In an example terminal-centric mode and embodiment the system method further comprises, during the establishment of the circuit switched call, the wireless terminal refraining from performing a routing area update and a combined routing area/location area update; and re-establishing a packet switched bearer in the LTE network. In an example network-centric mode and embodiment the system method further comprises a node of the LTE network ordering the wireless terminal to move to a circuit switched network for accommodating the circuit switched call without releasing a packet switched bearer of the packet switched session; and the wireless terminal performing a Location Area (LA) update but not performing a routing area update or a combined routing area/location area update.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2B showing an embodiment comprising a single receiver/transmitter with multiplexing on a burst period level; and FIG. 2C showing an embodiment comprising a dual receiver/single transmitter.

DETAILED DESCRIPTION

Figure 1A:
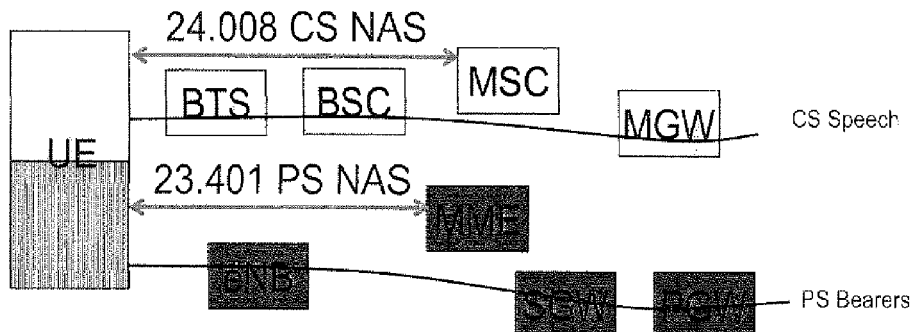
FIG. 1A is a diagrammatic view illustrating a fully UE-centric solution ADM solution where no coordination is needed between a GSM CS core and a LTE PS core.
Figure 1B:
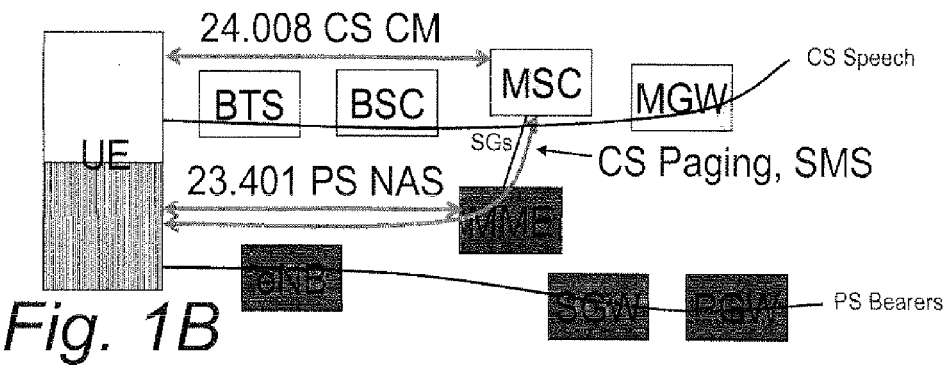
FIG. 1B is a diagrammatic view illustrating a network assisted ADM solution which can either be based on CS fallback (CSFB), or a solution that only reuses paging over LTE.
Figure 2A:
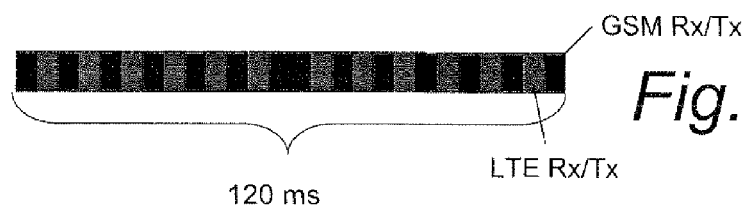
FIG. 2A, FIG. 2B, and FIG. 2C are differing example radio-realized embodiments illustrated of ADM solutions, with FIG. 2A showing an embodiment comprising a single receiver/transmitter with GSM at half rate and multiplexing on a TDMA frame level.
Figure 2B:
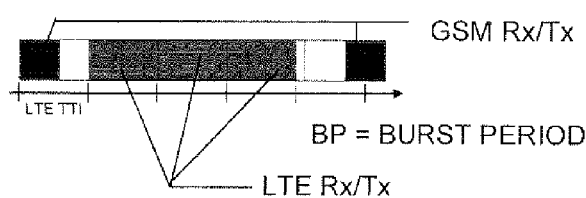
Figure 2C:
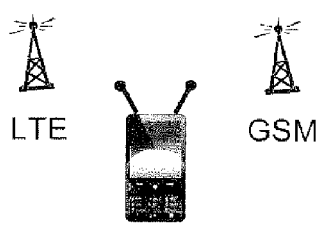
Figure 3:
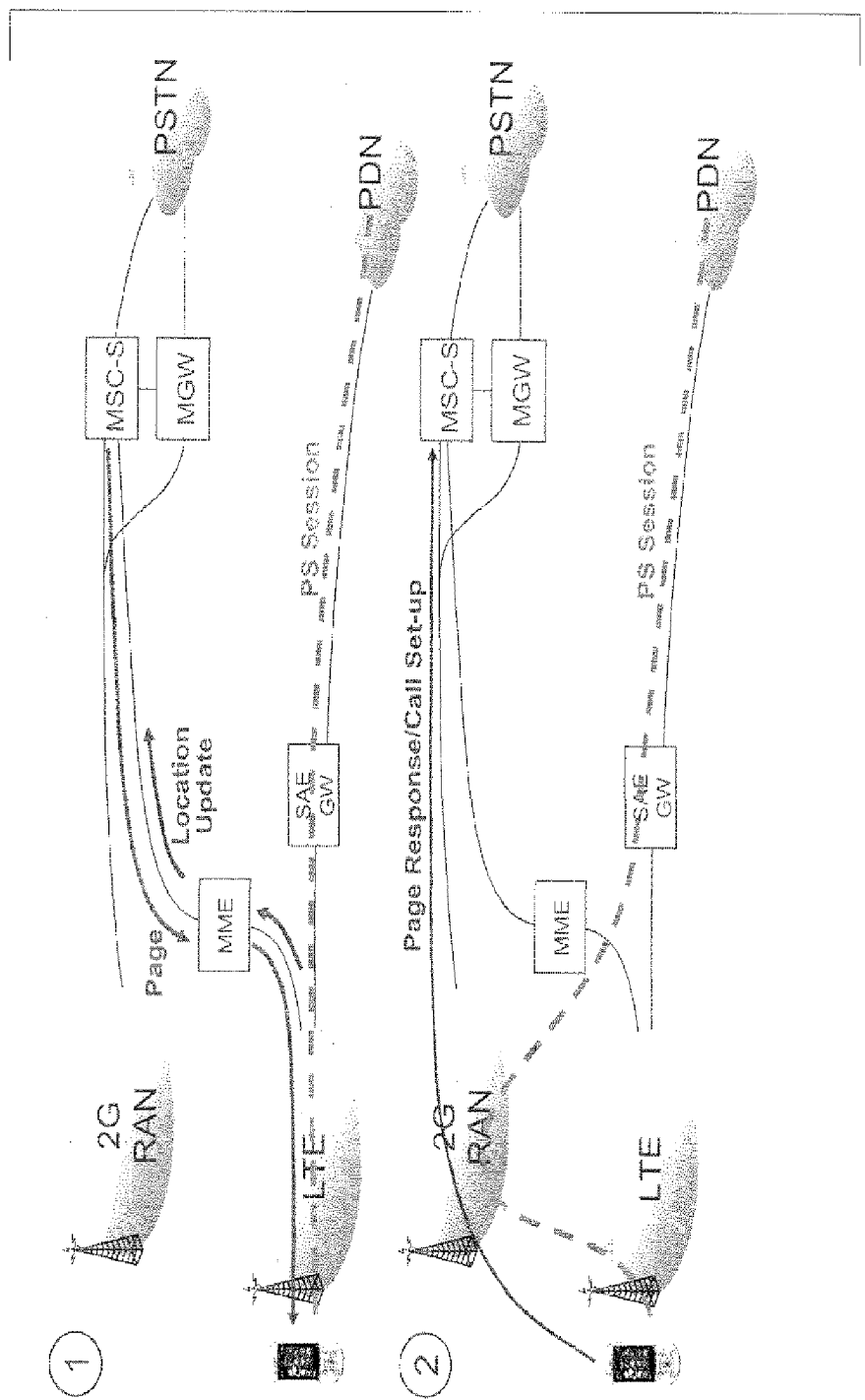
FIG. 3 is a diagrammatic view depicting movement of a packet switched session to 2G (e.g., Global System for Mobile communication (GSM)) radio access network as soon as a circuit switched (CS) voice call is originated or terminated, in accordance with conventional practice.
Figure 4:
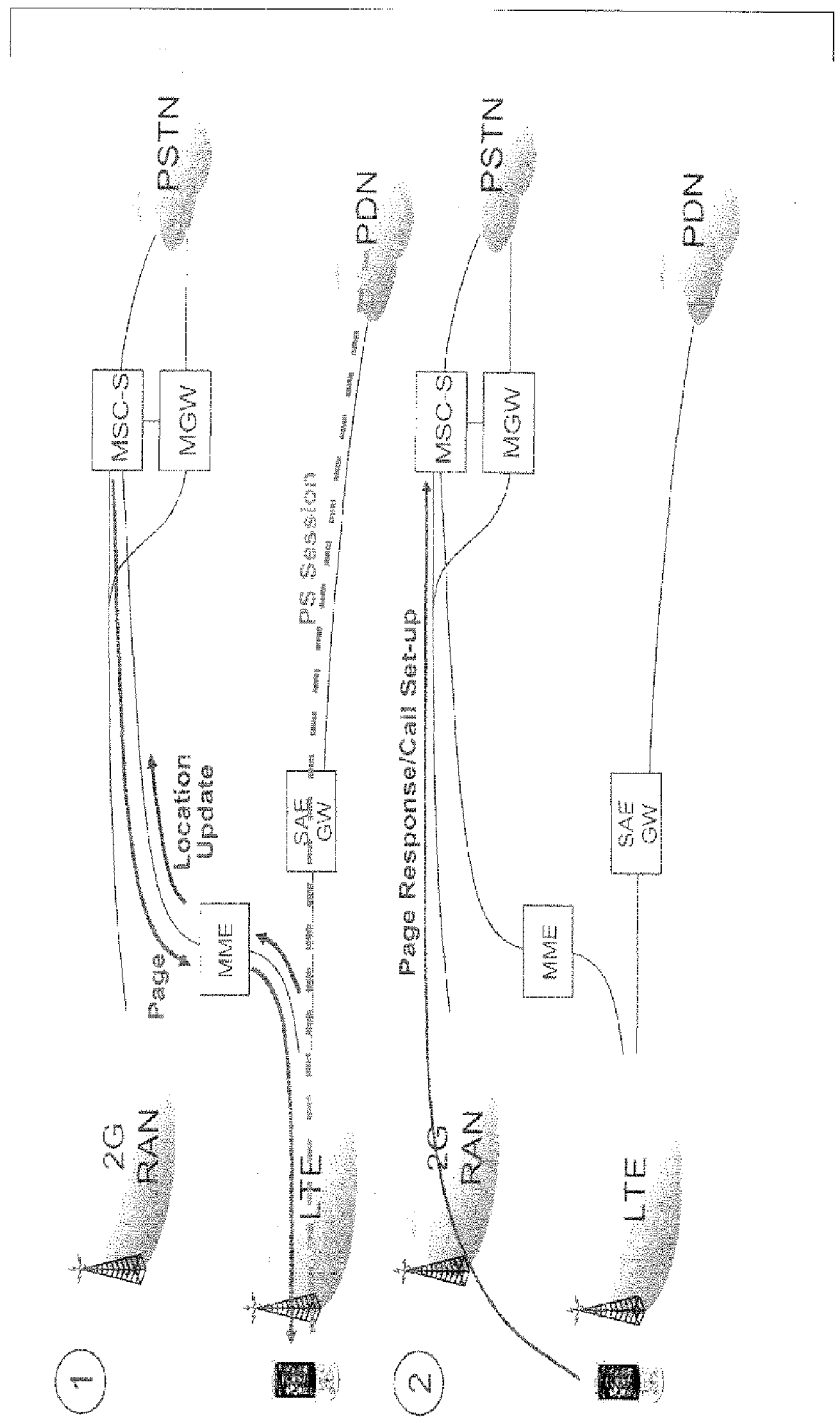
FIG. 4 is a diagrammatic view depicting suspension of a packet switched (PS) session upon origination or termination of a circuit switched (CS) voice call in accordance with conventional practice with multiplexing of circuit switched (CS) voice and a packet switched (PS) session is not supported in GSM.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 7:
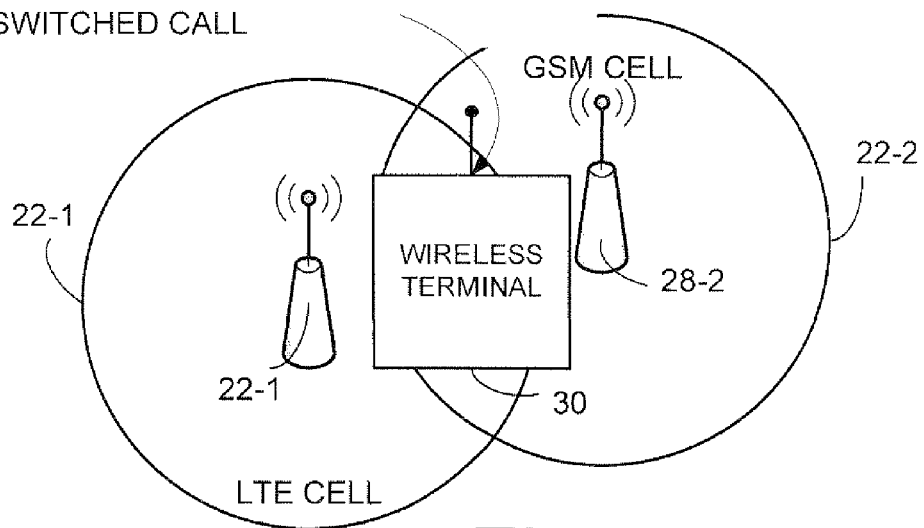
FIG. 7 is a diagrammatic view depicting a wireless terminal participating in access division multiplexing (ADM) with a LTE network and a GSM network.

The technology disclosed herein provides embodiments and modes wherein the circuit switched fallback (CSFB) solution is improved to enable multiplexing of circuit switched (CS) voice in Global System for Mobile communication (GSM) with a packet switched (PS) session in Long Term Evolution (LTE). FIG. 7 illustrates an example context and for one aspect of the technology disclosed herein wherein user equipment unit (UE) or wireless terminal 30 can participate in access division multiplexing (ADM) with two radio access technology networks in parallel. FIG. 7 shows a cell of Long Term Evolution (LTE) network 22-1 and a cell of Global System for Mobile communication (GSM) network 22-2 (a 2G network). The LTE network 22-1 comprises a base station or eNodeB 28-1 while the 2G network 22-2 comprises base station 28-2. As mentioned above, the LTE network 22-1 does not provide circuit switched (CS) services, so that a wireless terminal 30 participating in packet switched (PS) services offered by LTE network 22-1 must turn to another network, e.g., GSM network 22-2 for circuit switched (CS) services.

Figure 8:
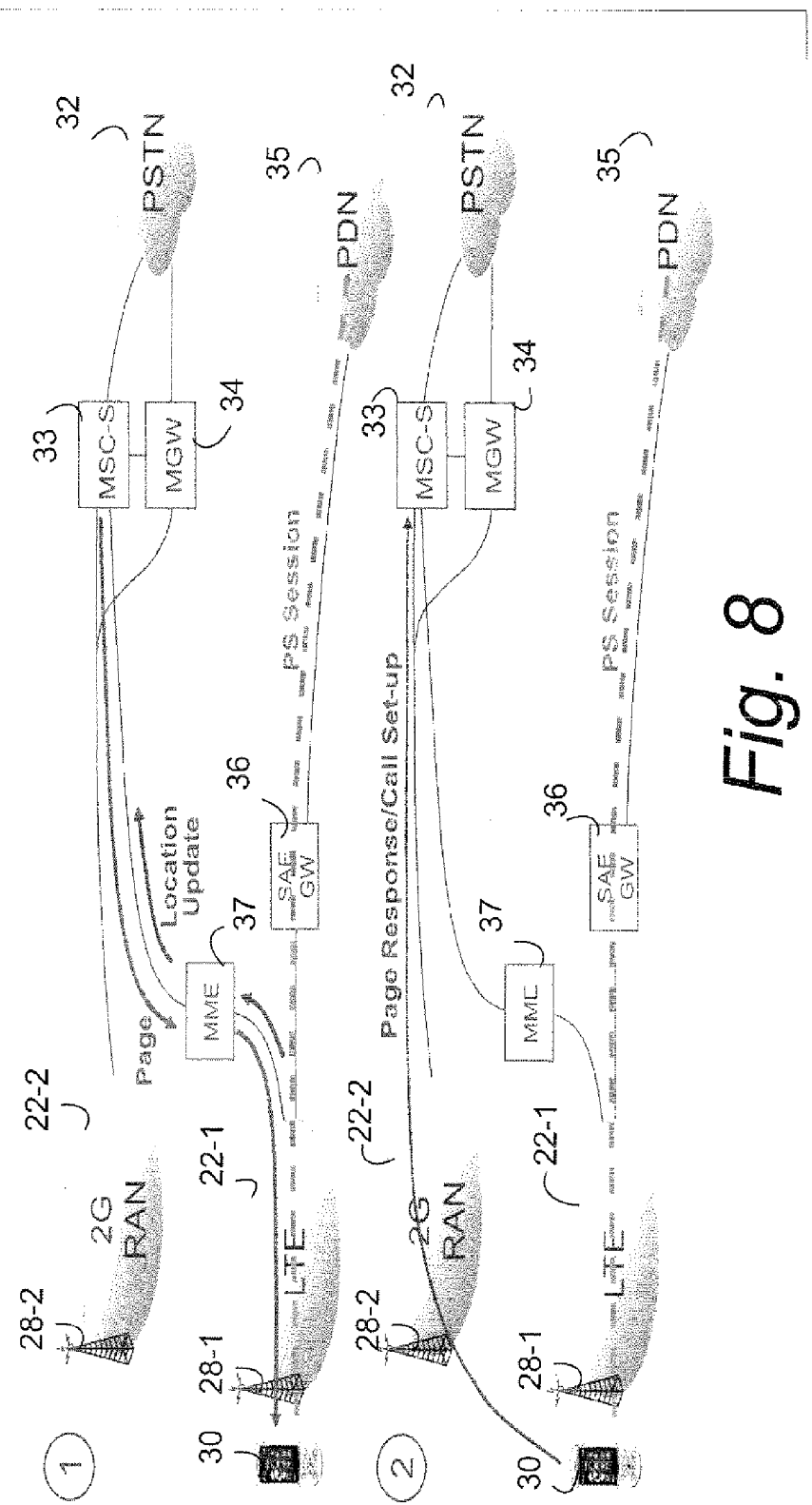
FIG. 8 is a diagrammatic view depicting an enhanced circuit switched (CS) fallback (CSFB) operation of the technology disclosed herein wherein a packet switched (PS) session is not moved to GSM.

FIG. 8 shows the connection of the GSM network 22-2 and the LTE network 22-1 to respective core networks. In particular, FIG. 8 shows the 2G or GSM network 22-2 connected to Public Switched Telephone Network (PSTN) 32 through Mobile Switching Center (MSC-S) 33 and Media Gateway (MGW) 34. FIG. 8 further shows the LTE network 22-1 connected to Packet Data Network (PDN) 35 through Serving Gateway (SAE-GW) 36. A first (top) segment of FIG. 8 also shows that, for a wireless terminal 30 engaged in a packet switched (PS) in LTE network 22-1, pages from the Public Switched Telephone Network (PSTN) 32 are sent through Mobility Management Entity (MME) 37.

In an example embodiment and mode of the technology disclosed herein and illustrated by a second (bottom) segment of FIG. 8, the wireless terminal 30 is moved to GSM network 22-2 by the circuit switched fallback (CSFB) alternative Cell Change Order (with or without NACC), or even autonomously as described in PCT Application No. PCT/SE2007/050180, Publication No. WO2008/088258, filed Mar. 23, 2007, which is incorporated herein by reference in its entirety. Despite the movement to GSM by the circuit switched fallback (CSFB) technique, in accordance with the technology disclosed herein and as illustrated in the second (bottom) segment of FIG. 8, the packet switched (PS) Session is retained in Long Term Evolution (LTE) network 22-1. Instead only the circuit switched (CS) call establishment is performed in GSM network 22-2. Keeping the packet switched (PS) session in the LTE network 22-1 upon performance of the CS call establishment (and the resulting CS call) is enabled by multiplexing the circuit switched (CS) call in GSM and the PS session in LTE, utilizing multiplexing capabilities such as that of PCT/SE2007/000358, incorporated herein by reference in its entirety.

Figure 9:
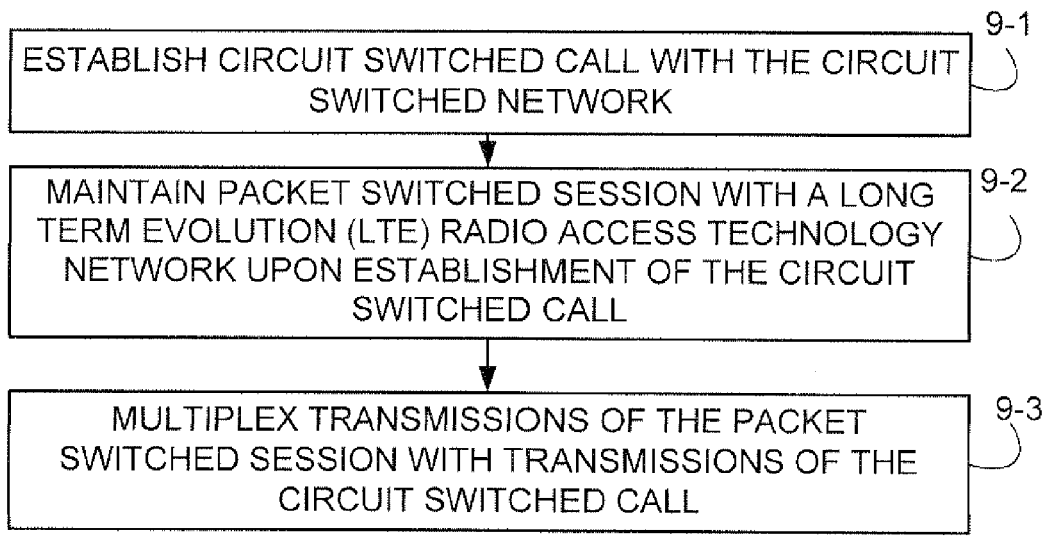
FIG. 9 is a flowchart showing basic, representative acts or steps comprising a method of operating wireless terminal according to an example mode and embodiment.

FIG. 9 shows example, basic, representative acts or steps involved in a method of operating a wireless terminal such as wireless terminal 30 of FIG. 8. Act 9-1 of FIG. 9 comprises establishing a circuit switched call with the circuit switched network. Act 9-2 comprises maintaining a packet switched session with a Long Term Evolution (LTE) radio access technology network 22-1 upon establishment of the circuit switched call. Act 9-3 comprises thereafter multiplexing transmissions of the packet switched session with transmissions of the circuit switched call. In an example implementation, the method further comprises maintaining the packet switched session during at least a portion of the circuit switched call, not just during establishment of the circuit switched call.

As used herein, "maintaining" a packet switched session upon establishment of a circuit switched call does not necessarily mean that the packet switched session remains continually intact and unaltered. While in some (e.g., "network-centric") example modes and embodiments the act of "maintaining" the packet switched session includes retaining existing packet switched bearers in essentially uninterrupted manner, in other (e.g., terminal-centric) example modes and embodiments the act of "maintaining" the packet switched session includes the possibility that packet switched bearers for the LTE packet switched session may be at least momentarily released. But any released packet switched bearers or the replacements therefore are re-established or resumed in the LTE network in lieu of bearers being established in any other network to carry on a session in such other network. Thus, in essence "maintaining" the packet switched session means that the packet switched session is not permanently preempted or transferred to another network (e.g., a circuit switched or 2G network) upon establishment of a circuit switched call.

As indicated above, the technology disclosed herein includes both terminal-centric and network-centric modes and embodiments. The terminal centric modes and embodiments can be implemented in a terminal based on existing 3GPP specifications. The network-centric modes and embodiments, on the other hand, do not release (and re-establish) the PS bearers in LTE, and thus not even a short interruption to the PS bearers will occur.

Figure 10A:
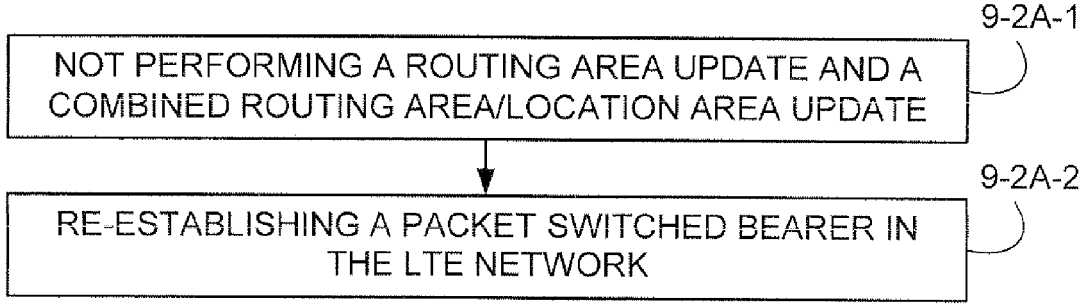
FIG. 10A is a flowchart showing basic, representative subacts or substeps comprising an act or step of the basic method of FIG. 9 for a terminal-centric mode and embodiment.

FIG. 10A shows examples subacts comprising act 9-2 for an example terminal-centric mode and embodiment. In particular, during the establishment of the circuit switched call, as subact 9-2A-1 the wireless terminal refrains from performing a routing area update procedure and a combined routing area/location area update procedure. Subact 9-2A-2 comprises the wireless terminal re-establishing a packet switched bearer in the LTE network.

Figure 10B:
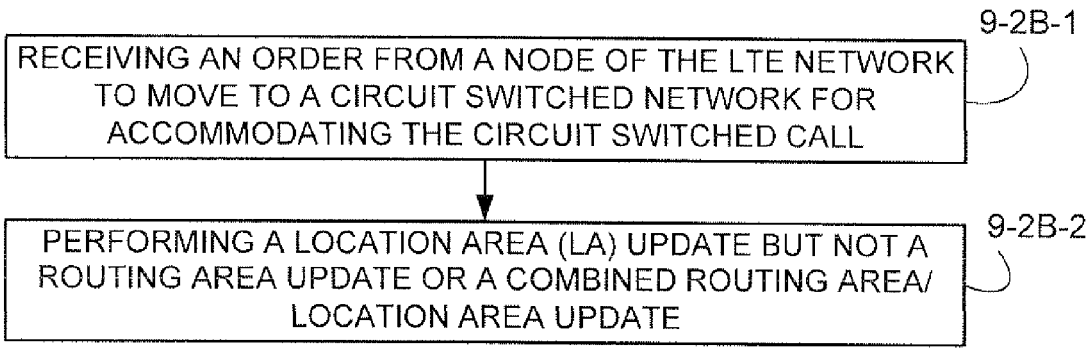
FIG. 10B is a flowchart showing basic, representative subacts or substeps comprising an act or step of the basic method of FIG. 9 for a network-centric mode and embodiment.

FIG. 10B shows examples subacts comprising act 9-2 for an example terminal-centric mode and embodiment. In particular, during the establishment of the circuit switched call, as subact 9-2B-1 the wireless terminal receives an order from a node of the LTE network to move to a circuit switched network for accommodating the circuit switched call. As subact 9-2B-2 the wireless terminal performs a Location Area (LA) update but does not perform a routing area update or a combined routing area/location area update.

Figure 11:
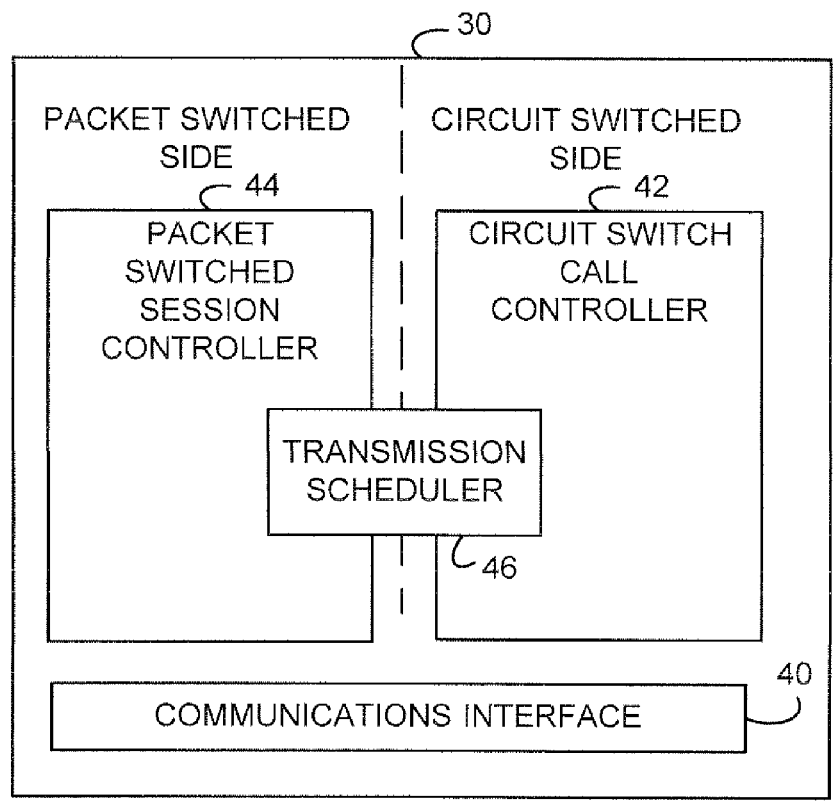
FIG. 11 is a schematic view of an example embodiment of a wireless terminal.

FIG. 11 shows an example, generic, and basic embodiment of wireless terminal 30. As shown in FIG. 11, wireless terminal 30 comprises communication interface 40; circuit switched call controller 42; and packet switched session controller 44. The circuit switched call controller 42 is configured to establish the circuit switched call and to govern the transmissions of the circuit switched call. The packet switched session controller 44 is configured to establish and maintain the packet switched session including the transmissions of the packet switched session. The communications interface 40 is configured to perform transmissions over a radio interface including the transmissions of the circuit switched call and the transmissions of the packet switched session.

Although the circuit switched call controller 42 and the packet switched session controller 44 work together in various respects, insofar as functionalities of the wireless terminal are concerned it is primarily the role of the packet switched session controller 44 to maintain the packet switched session with a Long Term Evolution (LTE) radio access technology network upon establishment of a circuit switched call. That is, within the wireless terminal 30 the subacts of FIG. 10A and FIG. 10B are primarily performed by packet switched session controller 44. In an example implementation the wireless terminal preferably maintains the packet switched session during at least a portion of the circuit switched call, not just during establishment of the circuit switched call.

The wireless terminal also comprises scheduler 46 which is configured to determine, e.g., which frame(s) or burst(s) are to be utilized for GSM and LTE transmissions. The scheduler 46 is particularly instrumental in facilitating the act 9-3 of multiplexing the LTE and GSM transmissions. As shown in FIG. 11, scheduler 46 is either jointly comprised of, or jointly consulted by, both circuit switched call controller 42 and 44.

Figure 12:
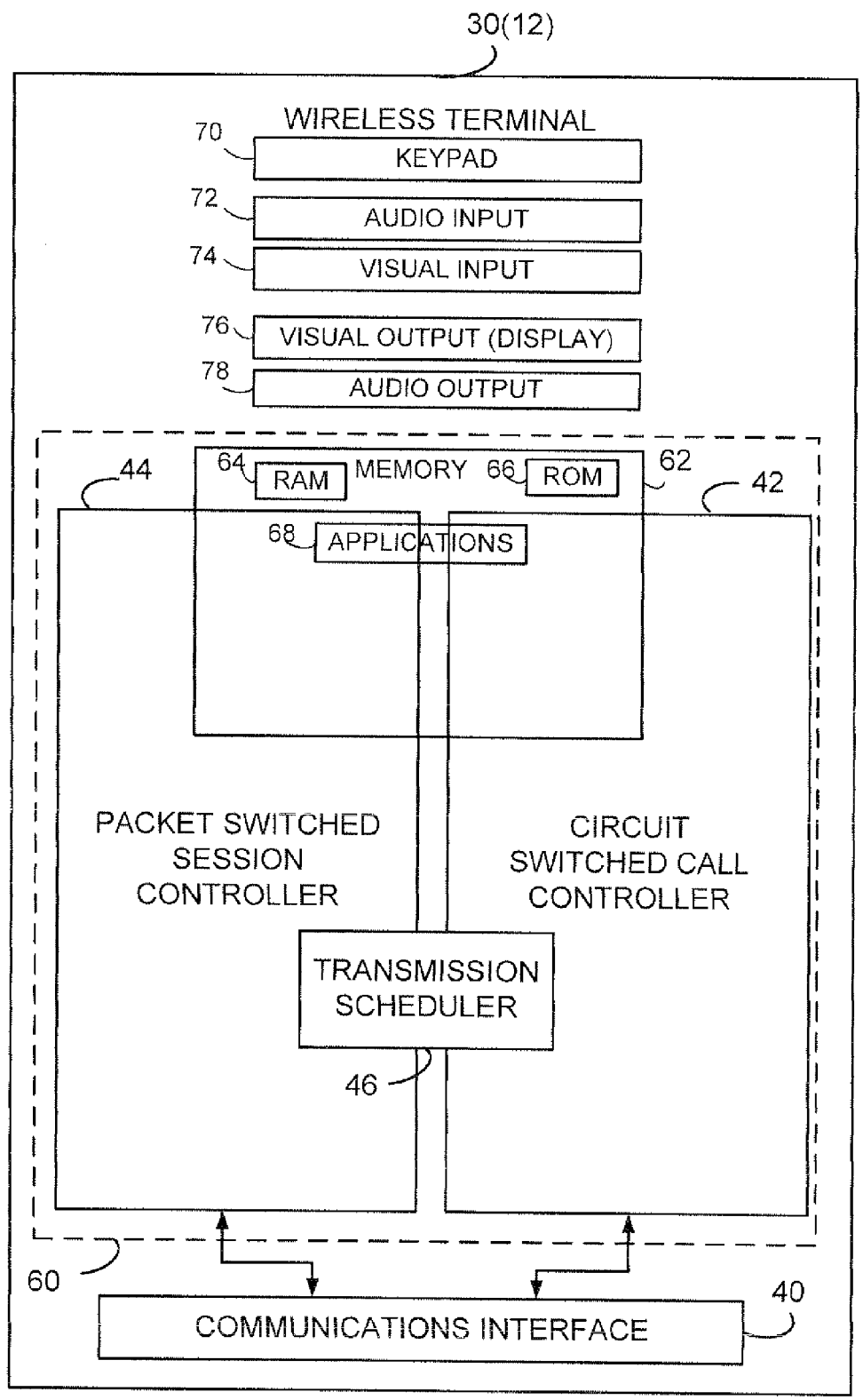
FIG. 12 is a more detailed schematic view of an example embodiment of a wireless terminal showing a platform implementation.

FIG. 12 shows a more detailed example embodiment of wireless terminal 30(12) wherein certain functionalities can be realized by and/or provided on a platform 60. The terminology "platform" is a way of describing how the functional units of a communications unit or node can be implemented or realized by machine. One example platform is a computer implementation wherein one or more of the elements framed by line 60, including but not limited to circuit switched call controller 42 and packet switched session controller 44.

In one example implementation, the functionalities shown as framed by platform 60 and even other functionalities can be realized by one or more processors which execute coded instructions stored in memory (e.g., non-transitory signals) in order to perform the various acts described herein. In such a computer implementation the wireless terminal can comprise, in addition to a processor(s), a memory section 62 (which in turn can comprise random access memory 64; read only memory 66; application memory 68 (which stores, e.g., coded instructions which can be executed by the processor to perform acts described herein); and any other memory such as cache memory, for example).

Whether or not specifically illustrated, typically the wireless terminal of each of the embodiments discussed herein can also comprise certain input/output units or functionalities, the representative input/output units for wireless terminal being illustrated in FIG. 12 as keypad 70; audio input device (e.g. microphone) 72; visual input device (e.g., camera) 74; visual output device (e.g., display 76); and audio output device (e.g., speaker) 78. Other types of input/output devices can also be connected to or comprise wireless terminal 30.

In the example of FIG. 12 the platform 60 has been illustrated as computer-implemented or computer-based platform. Another example platform 60 for wireless terminal can be that of a hardware circuit, e.g., an application specific integrated circuit (ASIC) wherein circuit elements are structured and operated to perform the various acts described herein.

Furthermore, it will be appreciated that, as used herein, "wireless terminal(s)" or "UE" can be mobile stations or user equipment units (UE) such as but not limited to mobile telephones ("cellular" telephones) and laptops with wireless capability), e.g., mobile termination), and thus can be, for example, portable, pocket, hand-held, computer-included, or car-mounted mobile devices which communicate voice and/ or data with radio access network.

Figure 13:
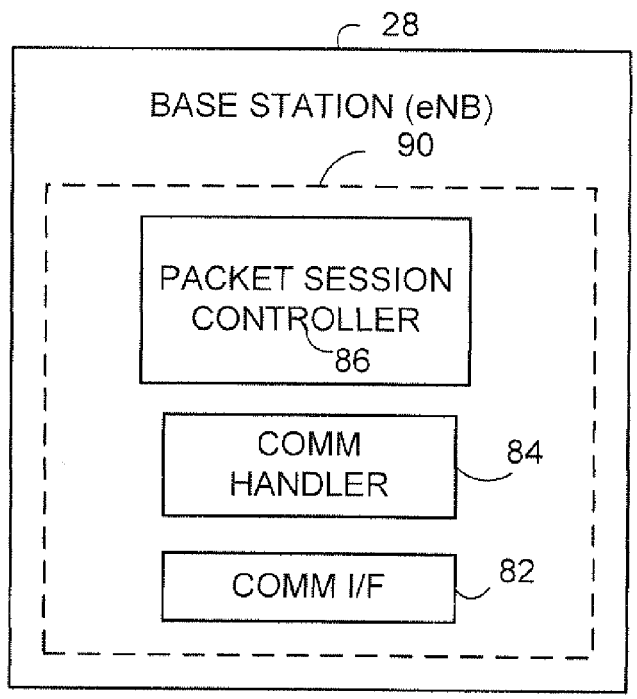
FIG. 13 is a schematic view of an example embodiment of a base station (e.g., eNodeB) of a Long Term Evolution (LTE) network.

FIG. 13 shows an example embodiment of a base station (e.g., eNodeB) of a Long Term Evolution (LTE) network. The eNodeB 28 comprises communications interface 82; communications handler 84, and packet switched session controller 86. Communications interface 82 facilitates the interleaved transmissions over the radio interface, as well as communication of signals and messages pertaining to setup, continuation, and management of packet switched sessions which are supervised by The communications handler 84 operates in accordance with a scheduling map for processing the interleaved transmissions, e.g., both pre-processing of data prior to transmission and post-processing of data after transmission. The packet switched session controller 86 governs and supervises the setup, continuation, and management of the packet switched sessions in which the eNodeB 28 of the Long Term Evolution (LTE) network participates. Among the actions performed or governed by packet switched session controller 86 are those depicted in FIG. 14.

It will be appreciated that, in one example implementation, the functionalities of eNodeB 28 shown as framed by platform 90 and even other functionalities can be realized by one or more processors which execute coded instructions stored in memory (e.g., non-transitory signals) in order to perform the various acts described herein, or by one or more hardware or integrated circuits. The foregoing remarks concerning a platform implementation of the wireless terminal are also generally applicable to platform implementation of the eNodeB.

Figure 14:
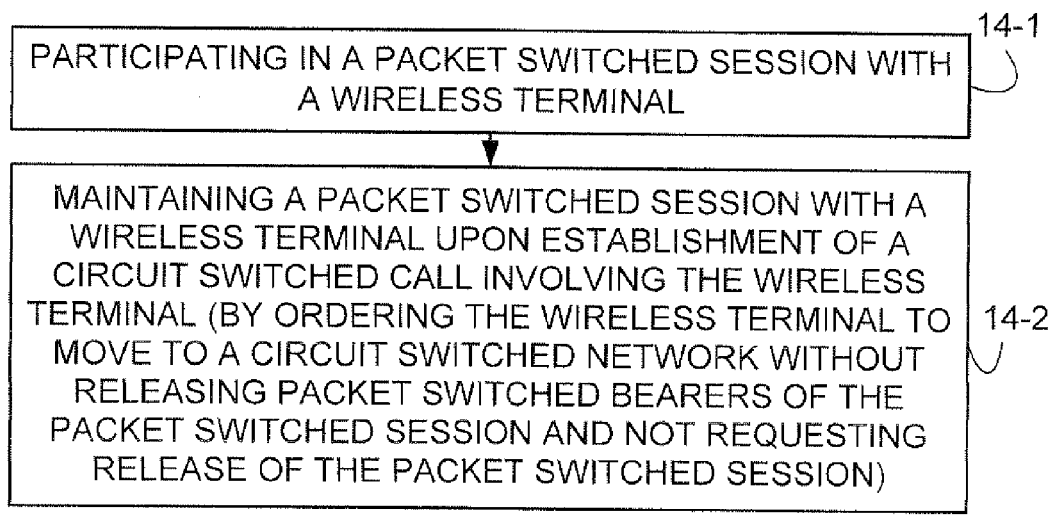
FIG. 14 is a flowchart showing basic, representative acts or steps comprising a method of operating a base station of a Long Term Evolution (LTE) network according to an example mode and embodiment.

FIG. 14 shows basic, representative acts or steps comprising a method of operating a base station (e.g., eNodeB 28) of a Long Term Evolution (LTE) network according to an example mode and embodiment. Act 14-1 comprises participating in a packet switched session with a wireless terminal. Act 14-2 comprises maintaining a packet switched session with a wireless terminal upon establishment of a circuit switched call involving the wireless terminal Act 14-2 of maintaining the packet switched session comprises ordering the wireless terminal to move to a circuit switched network without releasing packet switched bearers of the packet switched session and not requesting release of the packet switched session.

Figure 15:
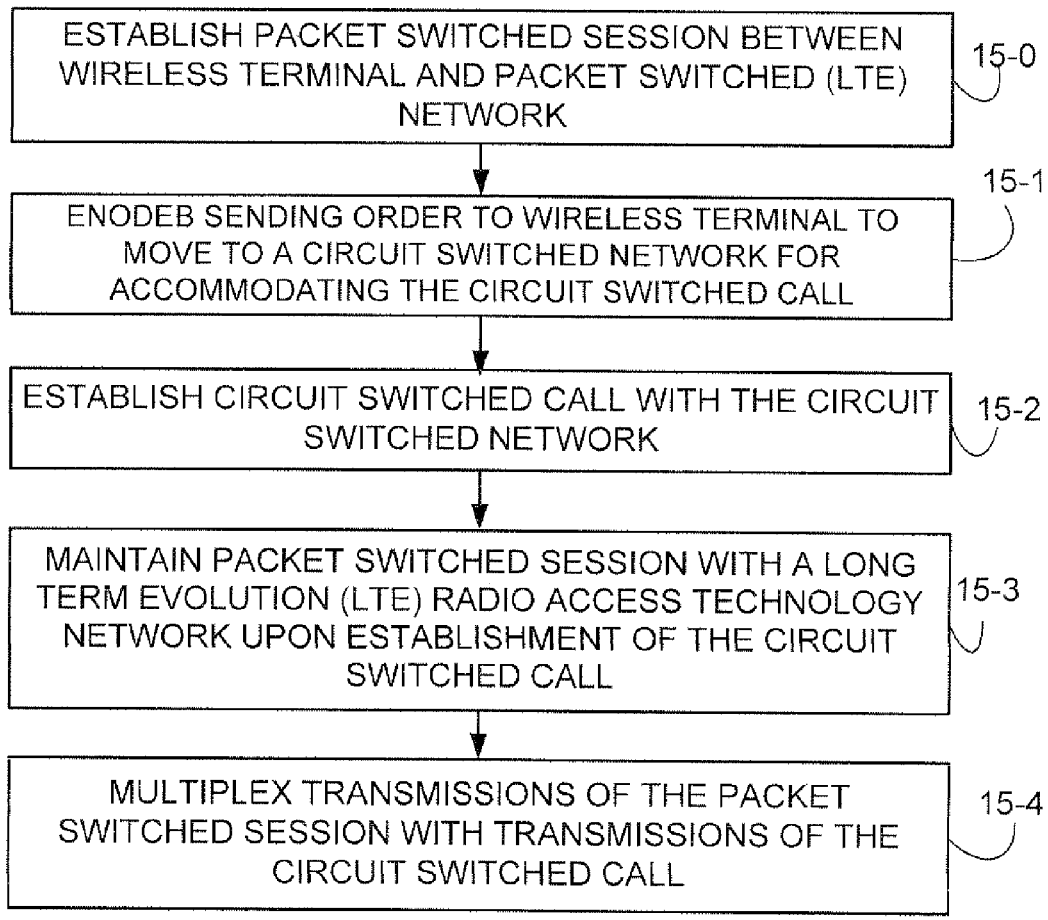
FIG. 15 is a flowchart showing basic, representative acts or steps comprising a method of operating a communications system according to an example mode and embodiment.

FIG. 15 shows basic, representative, example acts of steps involved in a method of operating a communications system which comprises LTE network 22-1 and GSM network 22-2. Act 15-0 comprises establishing a packet switched session between a wireless terminal and the Long Term Evolution (LTE) network. Act 15-1 comprises, during the packet switched session, the eNodeB 28 sending an order for the wireless terminal 30 to move to a circuit switched network for accommodating the circuit switched call. Act 15-2 comprises establishing a circuit switched call between the wireless terminal and the circuit switched network. Act 15-3 comprises, while establishing the circuit switched call, maintaining the packet switched session with the Long Term Evolution (LTE) radio access technology network. Act 15-4 comprises multiplexing transmissions of the packet switched session with transmissions of the circuit switched call. In an example mode and embodiment the system method further comprises maintaining the packet switched session during at least a portion of the circuit switched call, not just during circuit switched (CS) call establishment.

Figure 15A:
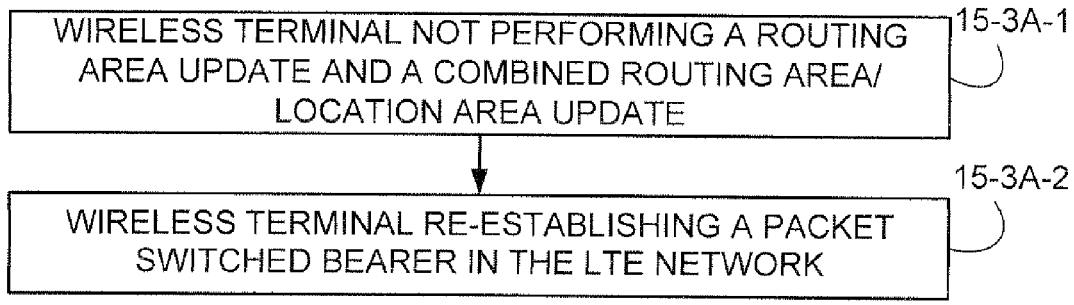
FIG. 15A is a flowchart showing basic, representative subacts or substeps comprising an act or step of the basic method of FIG. 15 for a terminal-centric mode and embodiment.

FIG. 15A shows examples subacts comprising act 15-3 for the example terminal-centric mode and embodiment. In particular, during the establishment of the circuit switched call, as subact 15-3A-1 the wireless terminal refrains from performing a routing area update procedure and a combined routing area/location area update procedure. Subact 15-3B-2 comprises the wireless terminal re-establishing a packet switched bearer in the LTE network.

Figure 15B:
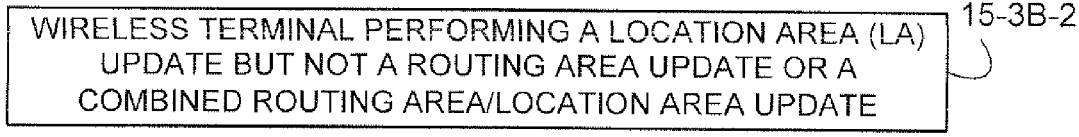
FIG. 15B is a flowchart showing basic, representative subacts or substeps comprising an act or step of the basic method of FIG. 15 for a network-centric mode and embodiment.

FIG. 15B shows examples subacts compirsing act 15-3 for the example terminal-centric mode and embodiment. In particular, during the establishment of the circuit switched call, as subact 15-3B-1 the wireless terminal performs a Location Area (LA) update (if needed) but does not perform a routing area update or a combined routing area/location area update. As mentioned above, the Location Area (LA) update is optional in the network-centric mode and embodiment since it is only performed in some cases, such as when the Location Area (LA) is stored in the wireless terminal from a previous registration.

Figure 5:
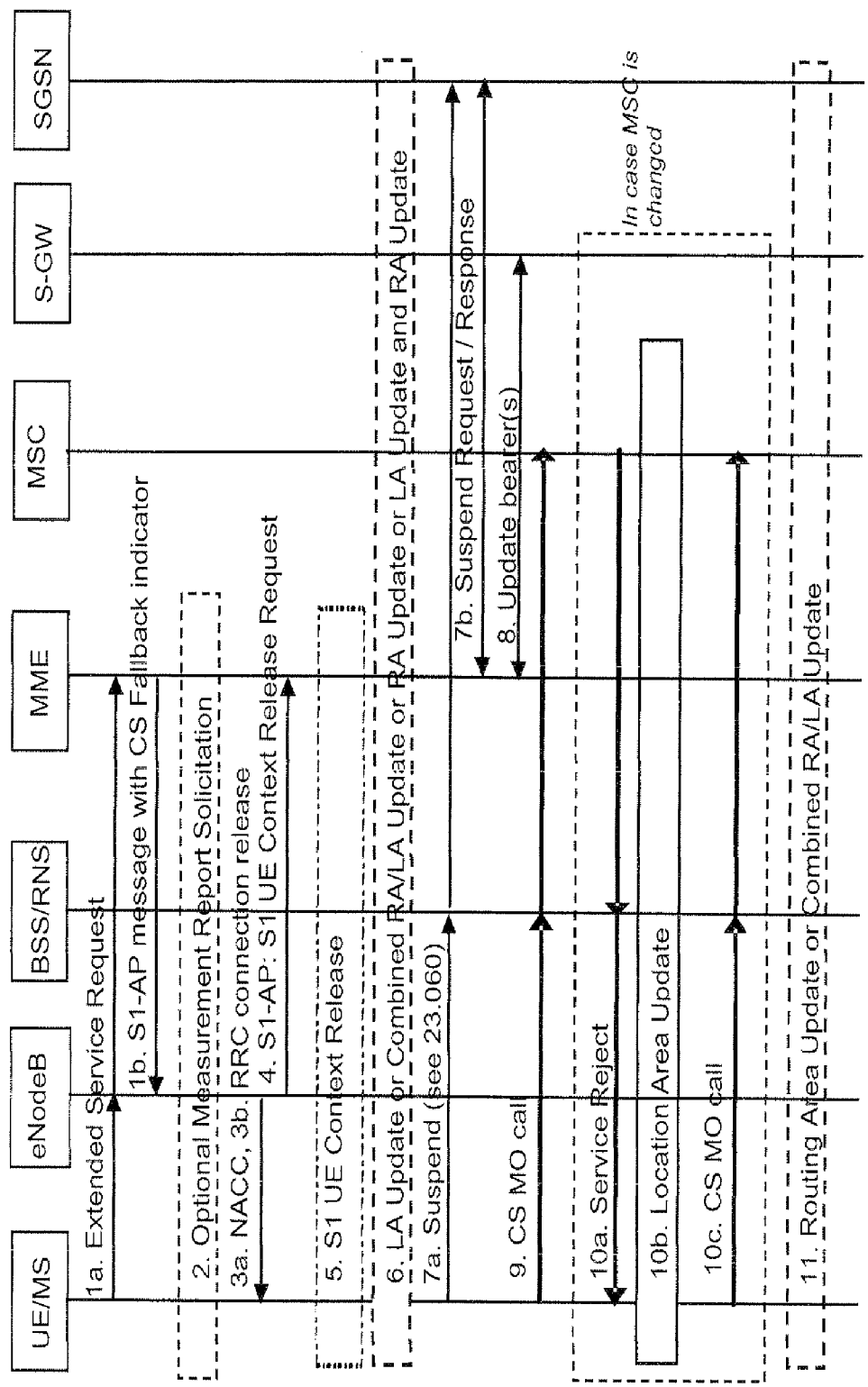
FIG. 5 is a diagrammatic view depicting a signalling sequence when a wireless terminal originates a circuit switched (CS) call in a circuit switched fallback (CSFB) solution as defined by 3GPP.
Figure 16:
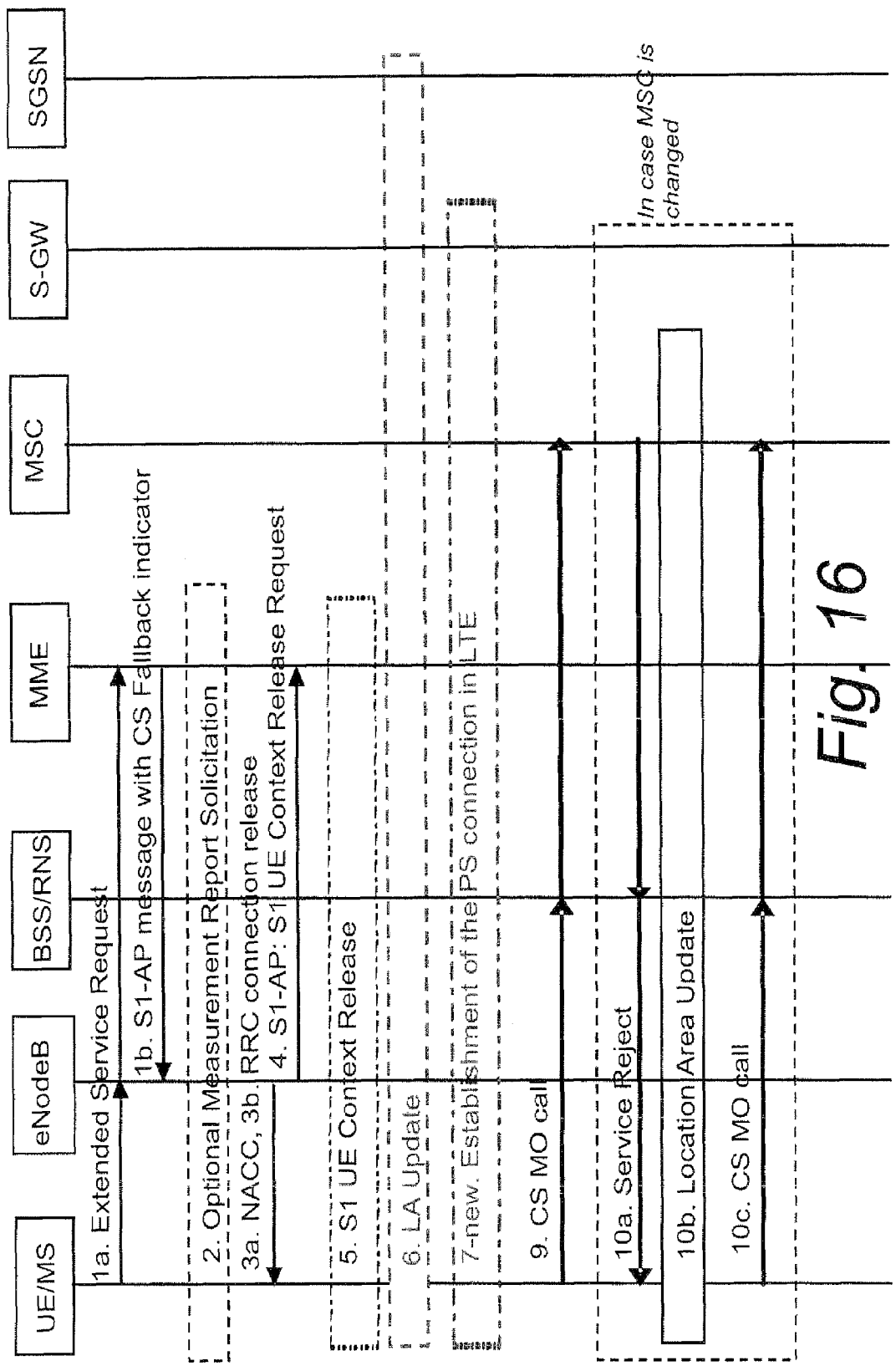
FIG. 16 is a diagrammatic view depicting an originating CS Call Request in E-UTRAN, and Call in GERAN without PS HO Modifications required.

FIG. 16, relative to FIG. 5, shows certain modifications for the terminal-centric mode and embodiment. The illustrated and below-discussed modifications are employed to implement the technology disclosed herein when originating a circuit switched (CS) Call Request in E-UTRAN, and Call in GERAN without packet switched (PS) handover (HO) for the terminal-centric mode and embodiment. As shown in FIG. 16, the changes to the circuit switched fallback (CSFB) solution of FIG. 5 are the following:

- No routing area (RA) Update procedure (or combined routing area (RA)/location area (LA) Update) procedure to the SGSN, but a location area (LA) Update is still optionally (as defined in 3GPP spec 23.272) performed (shown as changed step 6 of FIG. 16).
- No suspension of the GSM packet switched (PS) bearers (note that step 7a, 7b, and 8 of FIG. 5 are not used in FIG. 16).
- Re-establishment (by packet switched session controller 44 of wireless terminal 30) of the packet switched (PS) bearers in the Long Term Evolution (LTE) network (shown as the added step 7-new).
- No routing area (RA) Update procedure (or combined routing area (RA)/location area (LA) Update procedure) to resume the packet switched (PS) bearers after the call is finished since the PS bearers are maintained in LTE during the CS call (note that step 11 of FIG. 5 is not used in FIG. 16).

Optionally the wireless terminal could re-register for circuit switched (CS) services after the circuit switched (CS) call has been completed (by performance of a Tracking Area Update with circuit switched (CS) registration performed in LTE).

The timing between step 7-new and the steps 6-10 of FIG. 16 is not crucial and therefore can be varied. For example, the step 7-new can be performed at any point in time after step 5 of FIG. 16. Placement and order of step 7-new can be an implementation matter in, e.g., the wireless terminal.

The modification of step 3 of FIG. 16 could be used as a modification of existing RRC messages to only order the wireless terminal to move to the GSM Edge Radio Access Network (GERAN) to handle the circuit switched (CS) service (but keeping the PS connection in E-UTRAN). See, e.g., Mobility From EUTRA Command (Cell Change Order) and RRC Connection Release respectively, e.g., 3GPP TS 36.331, Radio Resource Control (RRC), Protocol Specification, which is incorporated herein by reference). It could also be done by creating a new message with the function of ordering the wireless terminal to move to GSM Edge Radio Access Network (GERAN) to handle the circuit switched (CS) service (but keeping the packet switched (PS) connection in E-UTRAN).

Figure 6:
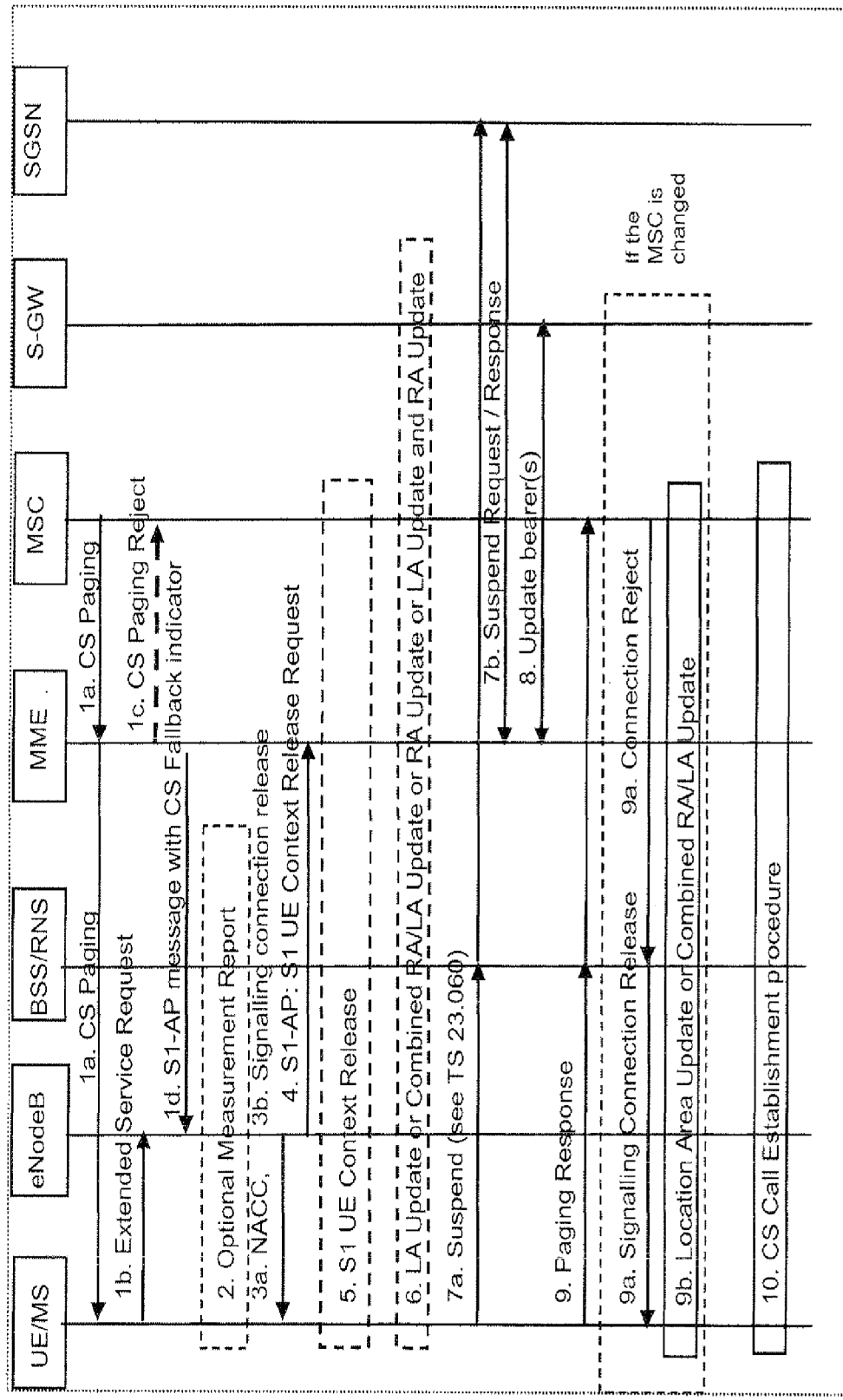
FIG. 6 is a diagrammatic view depicting a signalling sequence when a wireless terminal terminates a circuit switched (CS) call in a circuit switched fallback (CSFB) solution as defined by 3GPP.
Figure 17:
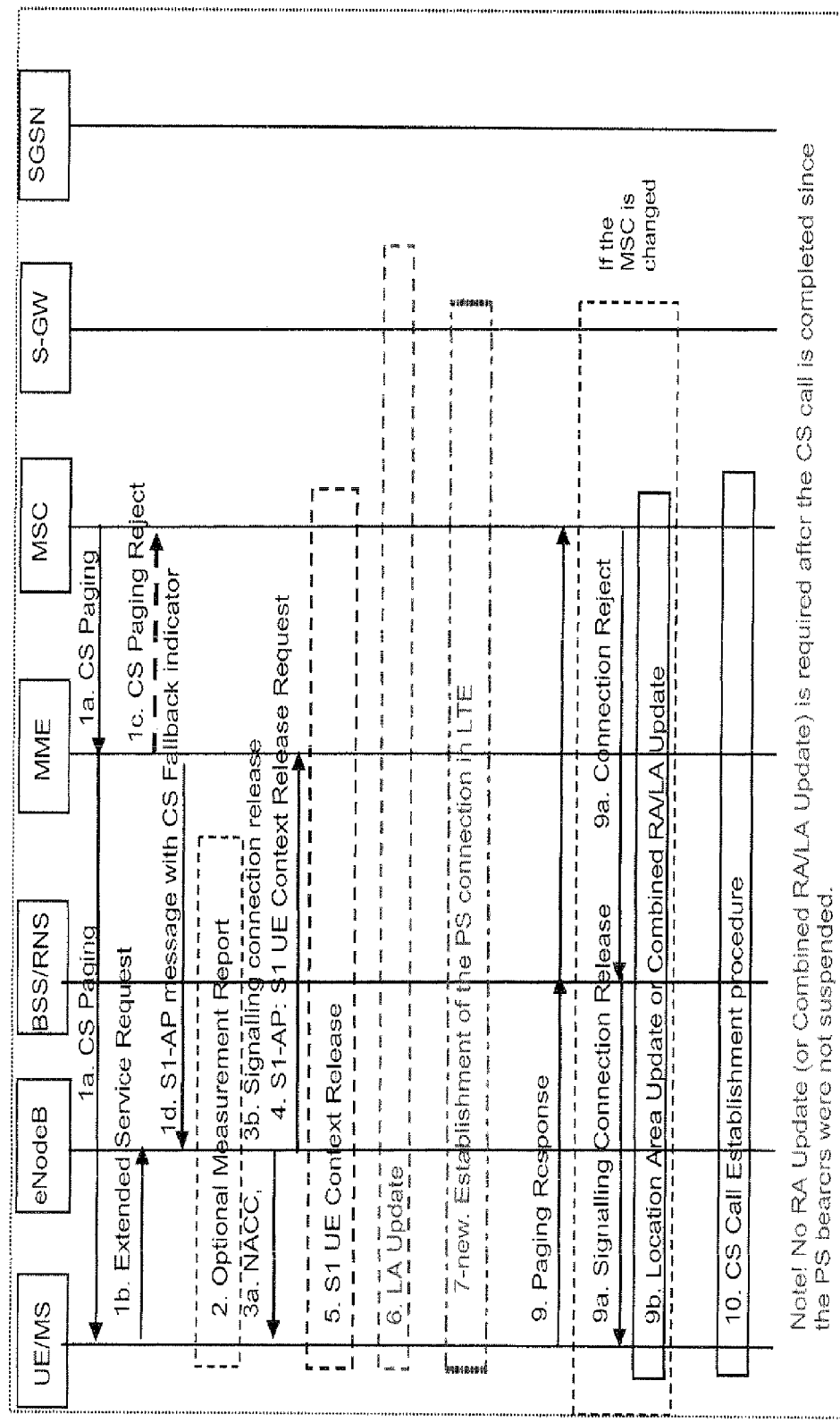
FIG. 17 is a diagrammatic view depicting terminating CS Call Request in E-UTRAN, Call in GERAN/UTRAN without PS HO Modifications required.

FIG. 17 illustrates, relative to FIG. 6, certain modifications for the terminal-centric mode and embodiment. The illustrated and below-discussed modifications are employed required to implement the technology disclosed herein when terminating a circuit switched (CS) Call Request in E-UTRAN, Call in GERAN/UTRAN without packet switched (PS) handover (HO) for the terminal-centric mode and embodiment. As shown in FIG. 17, the changes to the circuit switched fallback (CSFB) solution of FIG. 6 are the following:

No routing area (RA) Update (or combined routing area (RA)/location area (LA) Update) to the SGSN but LA Update still optionally (as defined in 3GPP spec 23.272) performed (shown as changed step 6 in FIG. 17).

No suspension of the packet switched (PS) bearers (note that step 7a, 7b, and 8 of FIG. 6 are not used in FIG. 17).

Re-establishment (by packet switched session controller 44 of wireless terminal 30) of the packet switched (PS) bearers in the Long Term Evolution (LTE) network (shown as the added step 7-new).

No routing area (RA) Update (or combined routing area (RA)/location area (LA) Update) to resume the packet switched (PS) bearers after the call is finished since the PS bearers are maintained in LTE during the CS call.

Optionally the wireless terminal could re-register for circuit switched (CS) services after the CS call has been completed (Tracking Area Update with CS registration performed in LTE).

The timing between step 7-new and the steps 6-10 of FIG. 17 is not crucial and therefore can be varied. For example, the step 7-new can be performed at any point in time after step 5 of FIG. 17. Placement and order of step 7-new can be an implementation matter in, e.g., the wireless terminal.

Figure 18:
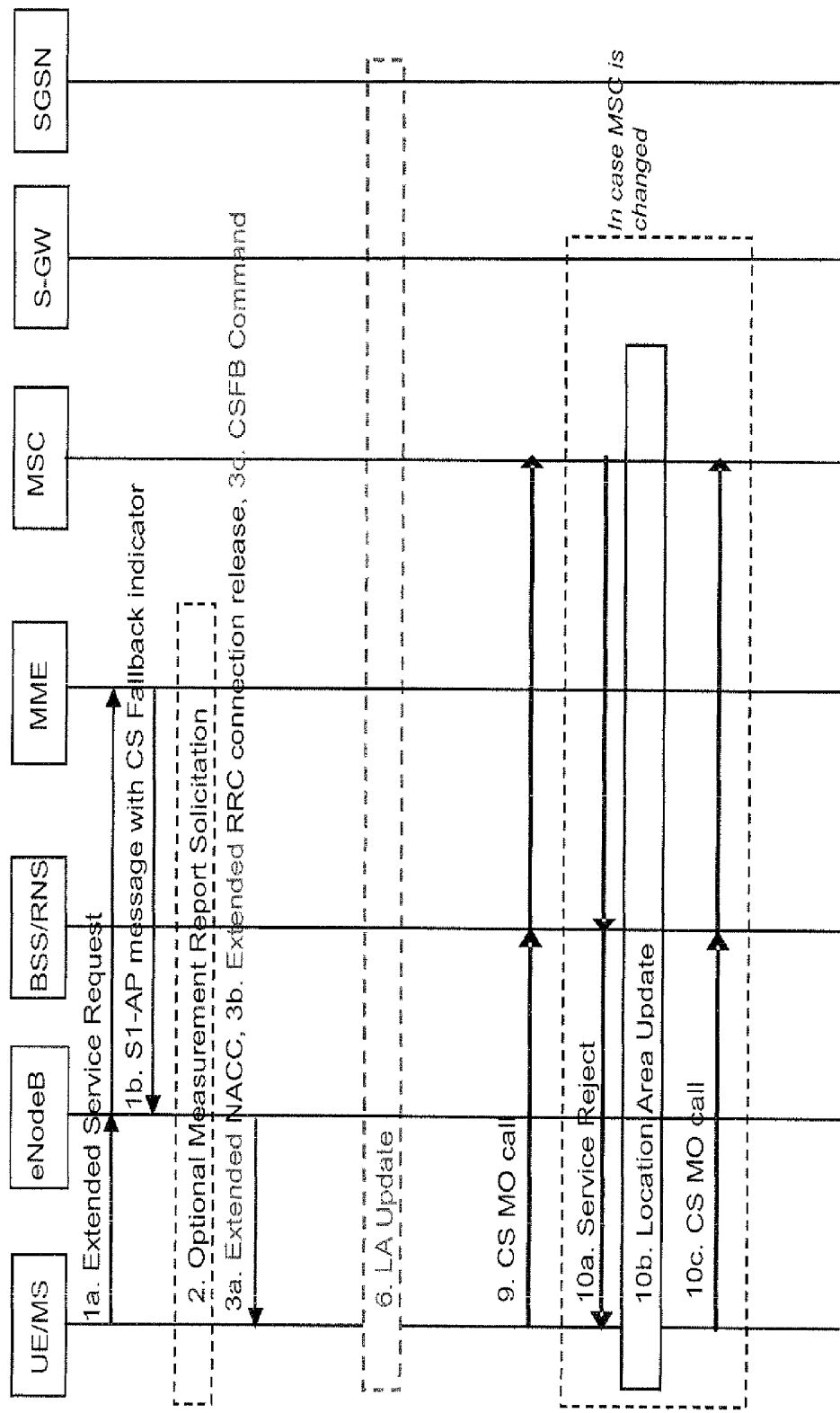
FIG. 18 is a diagrammatic view depicting an originating CS Call Request in E-UTRAN, and Call in GERAN without PS HO Modifications required.

As mentioned above, methods of the technology disclosed herein include both terminal-centric modes and embodiments and network-centric modes and embodiments. FIG. 18, relative to FIG. 5, shows certain modifications for the network-centric mode and embodiment. The modifications illustrated in FIG. 18 and below-discussed are employed for an originating circuit switched (CS) Call Request in E-UTRAN, Call in GERAN without PS handover (HO), for the network-centric mode and embodiment. Similarly, FIG. 19, relative to FIG. 5, shows certain modifications for the network-centric mode and embodiment a terminating CS Call Request in E-UTRAN, Call in GERAN/UTRAN without PS handover (HO) for the terminal-centric mode.

Figure 19:
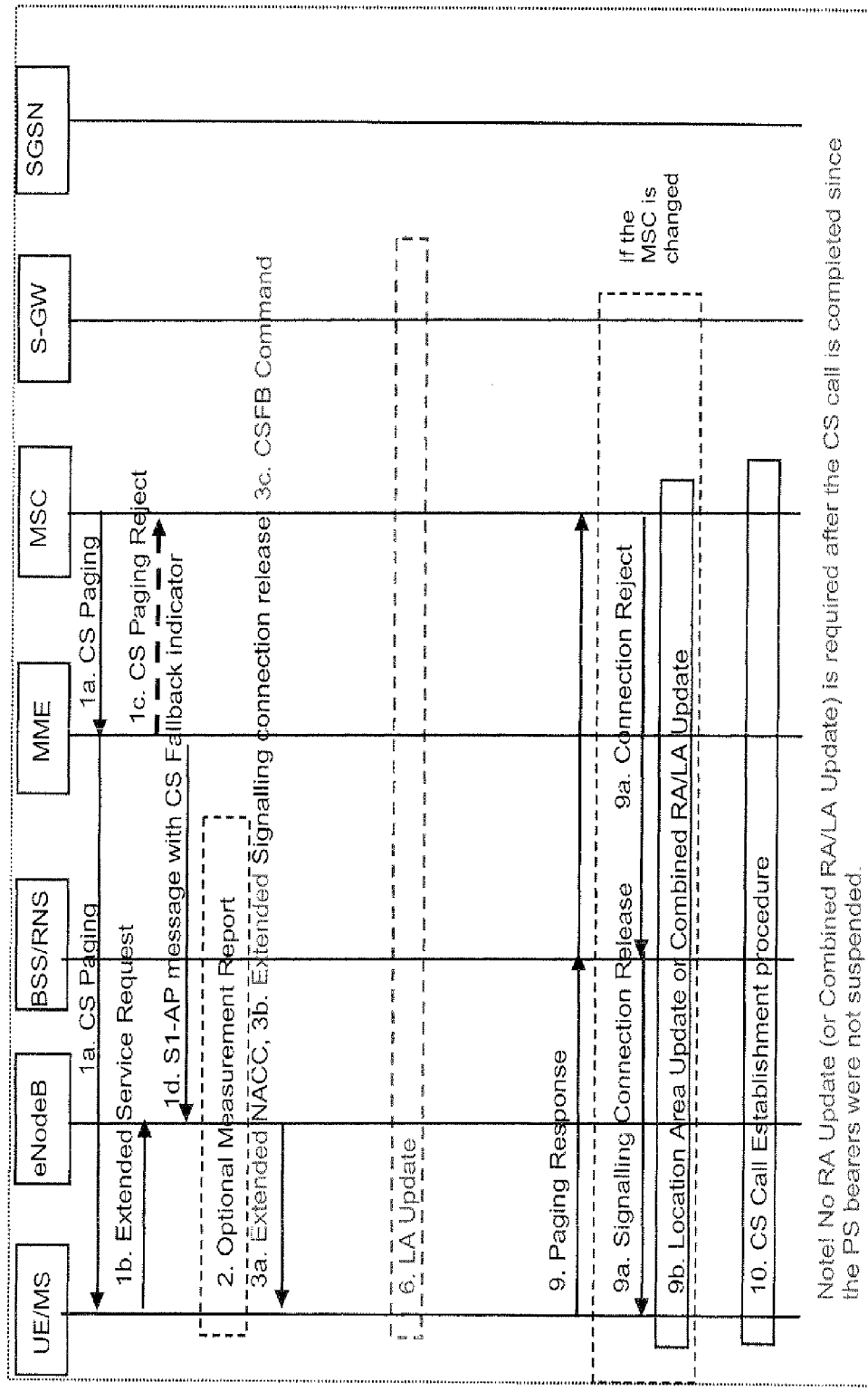
FIG. 19 is a diagrammatic view depicting terminating CS Call Request in E-UTRAN, Call in GERAN/UTRAN without PS HO Modifications required.

As shown in FIG. 18 and FIG. 19, for the terminal-centric embodiments and modes the changes to the circuit switched fallback (CSFB) solution of FIG. 5 are the following:

The release of the connection in the LTE access (step 3) is modified to only order the UE to move to GERAN and handle the CS service there.

No request release of the S1 connection (shown as removal of step 4 of FIG. 5).

No release of the S1 connection (shown as removal of step 5 of FIG. 5).

No RA Update (or combined RA/LA Update) to the SGSN but LA Update still performed (shown as changed step 6 in FIG. 18 and FIG. 19).

No suspension of the GSM packet switched (PS) bearers (shown as removal of step 7a, 7b, and 8).

No RA Update (or combined RA/LA Update) to resume the PS bearers after the call is finished since the PS bearers are maintained in LTE during the CS call (shown as removal of step 11).

Concerning acts 3b, 3a, and 3c of FIG. 18 and FIG. 19, the "extended" NACC, "Extended" RRC Connection Release, and CSFB Command are options on how a new function "go to the CS access but keep PS bearers in LTE" can be introduced in the 3GPP specifications. The difference between such an extended message and an ordinary message of similar name is allowance of the wireless terminal to keep the packet switched (PS) bearers but nevertheless still receive the necessary information to proceed with the call in GSM. Although including in the message title the word "release", such extended message primarily serves to command the wireless terminal not to release the packet switched (PS) session or packet switched (PS) bearers but to establish the CS call elsewhere.

The modification of step 3 of FIG. 18 and FIG. 19 could be used as a modification of existing RRC messages to only order the wireless terminal to move to the GSM Edge Radio Access Network (GERAN) to handle the circuit switched (CS) service (but keeping the PS connection in E-UTRAN). See, e.g., Mobility From EUTRA Command (Cell Change Order) and RRC Connection Release respectively, e.g., 3GPP TS 36.331, Radio Resource Control (RRC), Protocol Specification, which is incorporated herein by reference). It could also be done by creating a new message with the function of ordering the wireless terminal to move to GSM Edge Radio Access Network (GERAN) to handle the circuit switched (CS) service (but keeping the packet switched (PS) connection in E-UTRAN).

Optionally the wireless terminal could re-register for circuit switched (CS) services after the CS call has been completed (Tracking Area Update with CS registration performed in LTE).

Unlike the terminal-centric modes and embodiments, in the network-centric modes and embodiments the LTE packet switched bearers are never released (not even momentarily as in the terminal-centric modes and embodiments). Accordingly, in the terminal-centric modes and embodiments the packet switched bearers need not be "re-established" and therefore FIG. 18 and FIG. 19 do not include an act such as act 7-new.

The technology disclosed herein affords many advantages. For example, with the technology disclosed herein CS voice-centric devices can continue to use the PS services over the LTE access while being connected for a circuit switched (CS) call in Global System for Mobile communication (GSM).

The functions, events, steps, or acts described above may be implemented by units included in network nodes or other devices, which can be computer-implement or preformed by a processor or controller as those terms are herein expansively defined.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wireless terminal comprising:
a circuit switched call controller configured to establish a circuit switched call and to govern transmissions of the circuit switched call;
a packet switched session controller configured to establish and then maintain a packet switched session including transmissions of the packet switched session upon establishment of the circuit switched call;
a communications interface configured to perform transmissions over a radio interface including the transmissions of the circuit switched call and the transmissions of the packet switched session;
a processor; and
a memory, the memory containing instructions executable by the processor, whereby the wireless terminal is operative to:
maintain the packet switched session with a Long Term Evolution (LTE) radio access technology network upon establishment of the circuit switched call with a non-LTE radio access technology network;
multiplex transmissions of the packet switched session with transmissions of the circuit switched call; and
maintain the packet switched session with the LTE radio access technology network during at least a portion of the circuit switched call with the non-LTE radio access technology network;
wherein the packet switched session controller is configured upon the establishment of the circuit switched call to:
receive an order from a node of the LTE radio access technology network to move to a circuit switched network for accommodating the circuit switched call;
refrain from performing a routing area update and a combined routing area/location area update; and
re-establish a packet switched bearer in the LTE radio access technology network.

2. A wireless terminal comprising:
a circuit switched call controller configured to establish a circuit switched call and to govern transmissions of the circuit switched call;
a packet switched session controller configured to establish and then maintain a packet switched session including transmissions of the packet switched session upon establishment of the circuit switched call;
a communications interface configured to perform transmissions over a radio interface including the transmissions of the circuit switched call and the transmissions of the packet switched session;
a processor; and
a memory, the memory containing instructions executable by the processor, whereby the wireless terminal is operative to:
maintain the packet switched session with a Long Term Evolution (LTE) radio access technology network upon establishment of the circuit switched call with a non-LTE radio access technology network;
multiplex transmissions of the packet switched session with transmissions of the circuit switched call; and
maintain the packet switched session with the LTE radio access technology network during at least a portion of the circuit switched call with the non-LTE radio access technology network;
wherein the packet switched session controller is configured upon the establishment of the circuit switched call to:
receive an order from a node of the LTE radio access technology network to move to a circuit switched network for accommodating the circuit switched call; and
perform a Location Area (LA) update but not perform a routing area update or a combined routing area/location area update.

3. A method of operating a wireless terminal configured to communicate with a Long Term Evolution (LTE) radio access technology network and a circuit switched network, the method comprising:
establishing a circuit switched call with the circuit switched network;
refraining from:
performing a routing area update and a combined routing area/location area update;
suspending the packet switched bearer for the circuit switched network upon the establishment of the circuit switched call; and
resuming the packet switched bearer after termination of the circuit switched call;
re-establishing a packet switched bearer in the LTE radio access technology network;
maintaining a packet switched session with the LTE radio access technology network upon establishment of the circuit switched call with a non-LTE radio access technology network; and, upon the establishment of the circuit switched call;
multiplexing transmissions of the packet switched session with transmissions of the circuit switched call;
maintaining the packet switched session with the LTE radio access technology network during at least a portion of the circuit switched call with the non-LTE radio access technology network.

4. A method of operating a wireless terminal configured to communicate with a Long Term Evolution (LTE) radio access technology network and a circuit switched network, the method comprising:
receiving an order from a node of the LTE radio access technology network to move to the circuit switched network for accommodating the circuit switched call;
performing a Location Area (LA) update but not performing a routing area update or a combined routing area/location area update;
establishing a circuit switched call with the circuit switched network;
maintaining a packet switched session with the LTE radio access technology network upon the establishment of the circuit switched call with a non-LTE radio access technology network; and, upon the establishment of the circuit switched call;
multiplexing transmissions of the packet switched session with transmissions of the circuit switched call;

maintaining the packet switched session with the LTE radio access technology network during at least a portion of the circuit switched call with the non-LTE radio access technology network.

5. A method of operating a communications system comprising a circuit switched network and a Long Term Evolution (LTE) radio access technology network, the method comprising:

establishing a packet switched session between a wireless terminal and the LTE radio access technology network;

during the packet switched session establishing a circuit switched call between the wireless terminal and the circuit switched network;

a node of the LTE radio access technology network ordering the wireless terminal to move to the circuit switched network for accommodating the circuit switched call;

the wireless terminal refraining from performing a routing area update and a combined routing area/location area update;

the wireless terminal re-establishing a packet switched bearer in the LTE radio access technology network;

upon establishment of the circuit switched call with a non-LTE radio access technology network, maintaining the packet switched session with the LTE radio access technology network;

multiplexing transmissions of the packet switched session with transmissions of the circuit switched call;

maintaining the packet switched session with the LTE radio access technology network during at least a portion of the circuit switched call with the non-LTE radio access technology network.

6. The method of claim 5, further comprising the wireless terminal performing a Location Area (LA) update.

* * * * *

UNITED STATES PATENT AND TRADEMARK OFFICE
CERTIFICATE OF CORRECTION

PATENT NO. : 9,246,655 B2
APPLICATION NO. : 12/943685
DATED : January 26, 2016
INVENTOR(S) : Olsson et al.

It is certified that error appears in the above-identified patent and that said Letters Patent is hereby corrected as shown below:

On the Title Page, in Item (75), under "Inventors", in Column 1, Line 3, delete "Luleá" and insert -- Luleå --, therefor On the Title Page, in Item (60), Under "Related U.S. Application Data", in Column 1, Line 8, delete "Dec. 17, 2009." and insert -- Dec. 18, 2009. --, therefor.

In the Specification:

In Column 1, Lines 10-11, delete "(attorney docket: 2380-1425) to" and insert -- to --, therefor.

In Column 1, Lines 14-15, delete "(attorney docket: 2380-1426) to" and insert -- to --, therefor.

In Column 1, Lines 18-19, delete "(attorney docket: 2380-1427) to" and insert -- to --, therefor.

In Column 1, Lines 21-22, delete "(attorney docket: 2380-1428) to" and insert -- to --, therefor.

In Column 1, Lines 24-25, delete "(attorney docket: 2380-1429) to" and insert -- to --, therefor.

In Column 1, Lines 28-29, delete "(attorney docket: 2380-1433) to" and insert -- to --, therefor.

In Column 1, Line 31, delete "Dec. 17, 2009." and insert -- Dec. 18, 2009. --, therefor.

In Column 1, Line 37, delete "12/943,770to" and insert -- 12/943,770 to --, therefor.

In Column 1, Line 40, delete "12/943,612to" and insert -- 12/943,612 to --, therefor.

In Column 1, Line 43, delete "12/943,736to" and insert -- 12/943,736 to --, therefor.

In Column 1, Line 46, delete " 12/943,504to" and insert -- 12/943,504 to --, therefor.

Signed and Sealed this
Twenty-third Day of August, 2016

Michelle K. Lee
*Director of the United States Patent and Trademark Office*

CERTIFICATE OF CORRECTION (continued)
U.S. Pat. No. 9,246,655 B2

In the Specification continued:

In Column 11, Line 37, delete "terminal centric" and insert -- terminal-centric --, therefor.

In Column 14, Line 9, delete "compirsing" and insert -- comprising --, therefor.